US012204685B2

(12) United States Patent
Tehranipoor et al.

(10) Patent No.: US 12,204,685 B2
(45) Date of Patent: Jan. 21, 2025

(54) SECURITY PROPERTY-DRIVEN VULNERABILITY ASSESSMENTS OF ICs AGAINST FAULT-INJECTION ATTACKS

(71) Applicant: University of Florida Research Foundation, Incorporated, Gainesville, FL (US)

(72) Inventors: Mark M. Tehranipoor, Gainesville, FL (US); Farimah Farahmandi, Gainesville, FL (US); Huanyu Wang, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 538 days.

(21) Appl. No.: 17/457,498

(22) Filed: Dec. 3, 2021

(65) Prior Publication Data

US 2022/0180003 A1    Jun. 9, 2022

Related U.S. Application Data

(60) Provisional application No. 63/122,874, filed on Dec. 8, 2020.

(51) Int. Cl.
| | | |
|---|---|---|
| *G06F 21/72* | (2013.01) | |
| *G06F 21/55* | (2013.01) | |
| *G06F 21/57* | (2013.01) | |
| *G06F 21/75* | (2013.01) | |
| *G06F 30/337* | (2020.01) | |
| *G06F 30/398* | (2020.01) | |

(52) U.S. Cl.
CPC ............ *G06F 21/75* (2013.01); *G06F 21/554* (2013.01); *G06F 21/577* (2013.01); *G06F 30/398* (2020.01)

(58) Field of Classification Search
CPC ...... G06F 21/75; G06F 21/554; G06F 21/577; G06F 30/398; G06F 21/72; G06F 30/3308; G06F 30/337
See application file for complete search history.

(56) References Cited

U.S. PATENT DOCUMENTS

| | | | |
|---|---|---|---|
| 2014/0375353 A1* | 12/2014 | Sinanoglu | H04L 9/0866 326/8 |
| 2017/0103236 A1* | 4/2017 | Homayoun, Jr. | G06F 21/87 |
| 2019/0188391 A1* | 6/2019 | Margalit | G06F 21/577 |

\* cited by examiner

*Primary Examiner* — Nghia M Doan
(74) *Attorney, Agent, or Firm* — ALSTON & BIRD LLP

(57) ABSTRACT

Various embodiments provide methods, systems, computer program products, apparatuses, and/or the like for assessing vulnerability of an IC design to fault injection attacks, such as through a security property-driven vulnerability assessment framework for efficiently evaluating faults with respect to certain security properties associated with the IC design. In one embodiment, a method is provided. The method includes generating, using a fault-injection technique specification, one or more fault models describing attributes of one or more faults. The method further includes selecting, using the fault models and executable security properties associated with a design file of an IC design, a fault list identifying a plurality of possible faults for the IC design. The method further includes identifying, based at least in part on performing a fault simulation on the design file with the fault list, critical locations of the IC design. The method further includes implementing protections at the critical locations.

20 Claims, 11 Drawing Sheets

SECURITY PROPERTY-DRIVEN VULNERABILITY ASSESSMENTS OF ICs AGAINST FAULT-INJECTION ATTACKS

CROSS-REFERENCE TO RELATED APPLICATIONS

This application claims priority to U.S. Provisional Patent Application Ser. No. 63/122,874 filed on Dec. 8, 2020, which is incorporated herein by reference in its entirety, including any figures, tables, drawings, and appendices.

TECHNICAL FIELD

Embodiments of the present disclosure relate generally to computing security and, more particularly, to security property-driven vulnerability assessments of integrated circuits (ICs) against fault-injection attacks.

BACKGROUND

With the emergence of the Internet of Things (IoTs) regime, promising exciting new applications from smart cities to connected autonomous vehicles, security and privacy have emerged as major design challenges. Within the connected computing and sensing components, or the "things" in an IoT system, notably the cryptographic hardware and field programmable gate arrays (FPGAs) in embedded systems, artificial intelligence (AI) accelerators, digital signal processors (DSPs), and microprocessors are all highly vulnerable to diverse forms of physical and non-physical attacks. These attacks can effectively bypass the built-in security mechanisms in the design and put systems at risk. Among the attacks, fault-injection attacks have become a major concern to the computer security community, primarily due to their powerful capability in tampering with vulnerable locations in a device and ability for extracting secret. This is irrespective of the mathematical strength and robustness of the implemented security mechanisms.

In a fault-injection attack, the faults are intentionally injected in a system to compromise the security by causing the denial of service (DoS), achieving illegal authentication, or facilitating leakage of secrets in the system. Fault-injection attacks can be non-invasive (e.g., clock glitching or voltage glitching), semi-invasive (e.g., local heating or laser), or invasive (e.g., focused ion beam), which can be carried out by a variety of techniques and instruments with different cost and precision. Different forms of fault-injection attacks have been successfully demonstrated by researchers in academia as well as practitioners in the industry on many security-critical applications. This includes AES, DES, and RSA encryption algorithms, error correction code (ECC), radio-frequency identification (RFID), virtual machines, microcontrollers, as well as analog sensors. Almost all platforms, such as smart cards, system-on-chips (SoCs), FPGA-based embedded systems, and IoT devices, are vulnerable to fault-injection attacks, which corroborates the criticality of this attack vector.

To help prevent fault-injection attacks, many different countermeasures have been proposed in the past decade. Typically, there are two major categories of countermeasures: (i) intrusion detection and (ii) error detection. The first approach relies on detecting the physical facilitators of fault-injection attacks in the design and making the design physically inaccessible, which requires a tamper-proof packaging for the design as well as sensors to detect any physical tampering attempts. This approach has been applied to the IBM 4764, which is an exclusive cryptographic co-processor. However, such approach would be expensive with a large area/performance overhead and design effort, which makes it expensive to be applied to common industrial devices and IoTs. The other more cost-effective approach against fault-injection attack is error detection, which enables the design to detect the injected faults at runtime. One example of such approach is to use either hardware or time redundancy to detect the faults. However, this approach may involve a 100% area or performance overhead, making it difficult to deploy in practice.

Currently, there is limited research in assessing the susceptibility of a design to fault-injection attacks at the very early design stage. Additionally, fully equipped automated tools are lacking to assess which location of the design might be likely injected with faults to result in security violation or leakage of secret information. There is no available well-defined method for the designers to identify a part of the design as the priority to be protected against fault-injection attacks. As a result, the designers often opt for a solution that aims at protecting the whole design, which might not be necessary and practically feasible, and will require significant resources on the chip. Therefore, a detailed and accurate assessment of the design vulnerability to fault-injection attacks at the pre-silicon stage is necessary. Various embodiments of the present disclosure provide such a detailed and accurate assessment that enables more efficient local countermeasures to be developed to reduce the overall protection overhead on area, power, and performance while ensuring security.

BRIEF SUMMARY

Embodiments herein relate to a security property-driven vulnerability assessment framework that bridges the gap between the need for automated security assessment tools against fault-injection attacks and the capability of existing computer-aided design (CAD) tools commonly used in practice. The present framework, which may also be referred to as security property-driven vulnerability assessments of ICs against fault-injection attacks, may be applied to designs at gate-level. The present framework applies to both FPGA and ASIC.

Embodiments herein relate to a security property-driven vulnerability assessment framework that is guided or otherwise based at least in part on a set of security properties defined for each IC design. From an attacker's point of view, a random fault would probably result in a random output, which may not necessarily help with the attack. Only the faults that can violate security properties (e.g., bypass the internal rounds of an AES) would facilitate a successful attack. If there are faults injected in the design, but there is no security property violated, the threat from the injected faults would be very limited. Therefore, various embodiments of vulnerability assessment described herein are guided by a set of security properties in the design. By guaranteeing that there is no security property violated, the resiliency of the design against fault-injection attacks would be significantly increased.

In various embodiments, a fault-injection attack assessment may be performed before the chips are fabricated or the design is implemented in an FPGA. Otherwise, it would significantly impact the overall cost of building secure hardware. It follows the well-known "rule-of-ten" principle in the integrated circuit (IC) test, which notes that the cost of detecting and fixing a fault late in the chip design and life cycle multiplies by 10 times at each stage (from IC to board to system). Similarly, a vulnerability to fault-injection attacks identified at a later stage in the system life cycle could have a substantial cost impact. Hence, in various embodiments, the fault-injection attack assessment may be carried out at the early stage of the design process (e.g., gate-level), thereby enabling improved flexibility in threat mitigation in early and/or design stages. Various embodiments described herein provide a novel automated framework to perform a comprehensive fault-injection attack assessment. The current electronic design automation (EDA) tools are not equipped to support fault-injection attack vulnerability assessment. Therefore, various embodiments provide various technical advantages over existing methods involving tedious manual design reviews performed by designers, which are time-consuming and hard to guarantee the accuracy of results.

Embodiments herein (e.g., the present framework) may be driven by pre-defined security properties that should be preserved in order to maintain the integrity, confidentiality, and availability of the design. Embodiments herein can identify the most vulnerable locations to fault-injection attacks in the design so that by protecting these locations no security properties would be violated.

Further, a metric is presented herein to characterize fault models and generate the corresponding global or local fault list in the framework presented herein. The fault feasibility metric is integrated into embodiments of the present disclosure to evaluate the feasibility of the fault using a setup-time violation based fault-injection technique.

Embodiments herein can provide design suggestions against local fault-injection techniques for later stages in the IC design flow (e.g., physical design).

In accordance with one aspect of the present disclosure, a method for assessing fault-injection vulnerability of an integrated circuit (IC) design is provided. In various embodiments, the method includes characterizing, based at least in part on a fault-injection technique specification, one or more fault models. The method further includes generating, based at least in part on the one or more fault models and one or more executable security properties associated with a design file of an IC design, a fault list identifying a plurality of possible faults for the IC design. The method further includes identifying, based at least in part on performing a fault simulation on the design file with the fault list, one or more critical locations of the IC design.

In accordance with another aspect of the present disclosure, an apparatus for assessing fault-injection vulnerability of an IC design is provided. The apparatus includes at least one processor and at least one memory including program code. In various embodiments, the at least one memory and the program code are configured to, with the at least one processor, cause the apparatus to at least characterize, based at least in part on a fault-injection technique specification, one or more fault models. The at least one memory and the program code are further configured to, with the at least one processor, cause the apparatus to at least generate, based at least in part on the one or more fault models and one or more executable security properties associated with a design file of an IC design, a fault list identifying a plurality of possible faults for the IC design. The at least one memory and the program code are further configured to, with the at least one processor, cause the apparatus to at least identify, based at least in part on performing a fault simulation on the design file with the fault list, one or more critical locations of the IC design.

In accordance with yet another aspect of the present disclosure, a non-transitory computer storage medium including instructions for assessing fault-injection vulnerability of an IC design is provided. In various embodiments, the instructions are configured to cause one or more processors to at least perform operations configured to characterize, based at least in part on a fault-injection technique specification, one or more fault models. The instructions are further configured to cause one or more processors to at least perform operations configured to generate, based at least in part on the one or more fault models and one or more executable security properties associated with a design file of an IC design, a fault list identifying a plurality of possible faults for the IC design. The instructions are further configured to cause one or more processors to at least perform operations configured to identify, based at least in part on performing a fault simulation on the design file with the fault list, one or more critical locations of the IC design.

BRIEF DESCRIPTION OF EXEMPLARY DRAWINGS

So that the present disclosure can be understood by those of ordinary skill in the art, a more detailed description can be had by reference to aspects of some illustrative embodiments, some of which are shown in the accompanying drawings.

FIGS. 4A, 4B, 4C, 4D, and 4E illustrate example security property-driven fault-injection vulnerability assessment processes, for use with embodiments of the present disclosure.

Figure 5A:
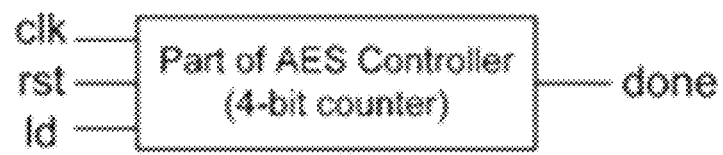

FIG. 5A illustrates an example fan-in circuit.

Figure 5B:
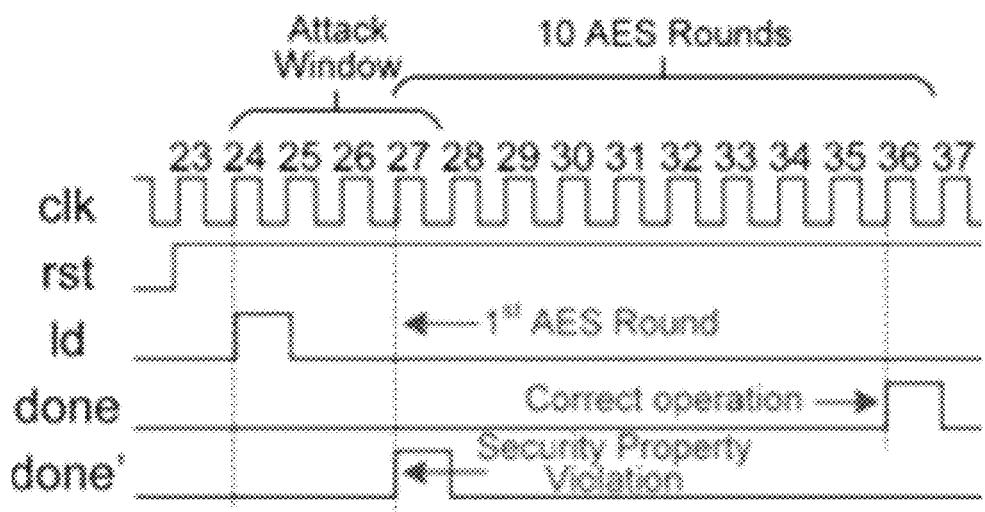

FIG. 5B illustrates an example waveform of SP1.

Figure 6:
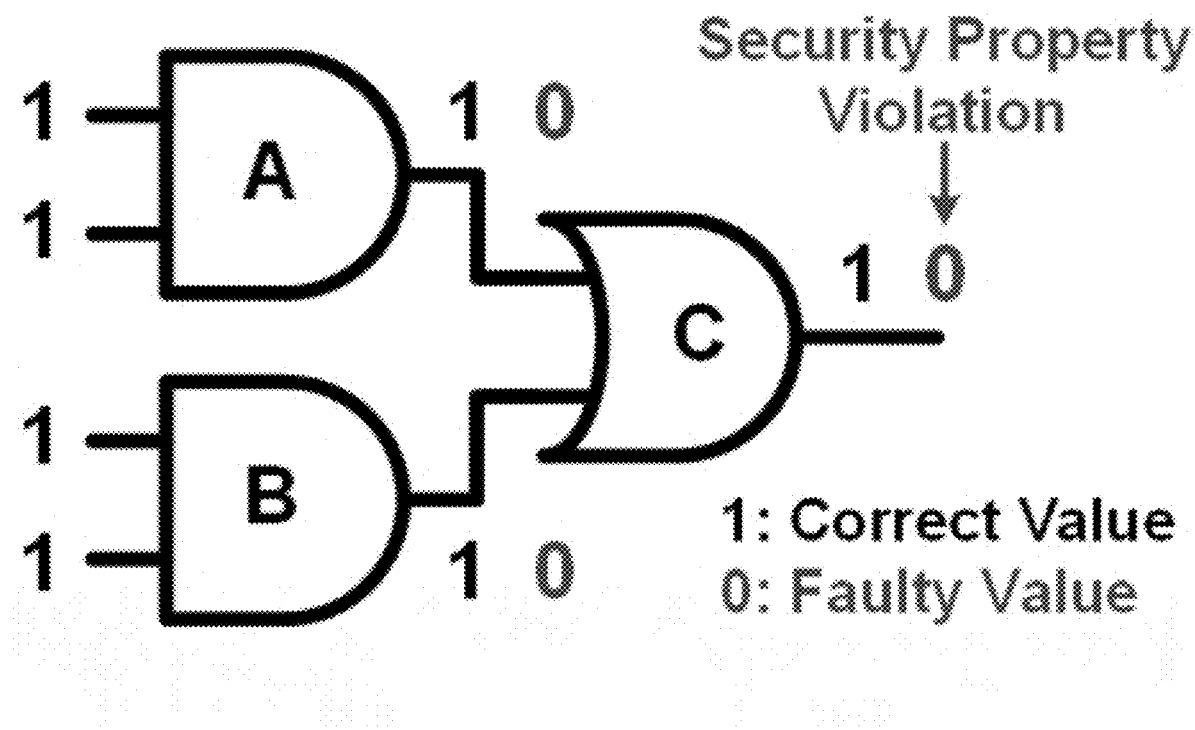

FIG. 6 illustrates an example identification of critical faults.

Figure 7:
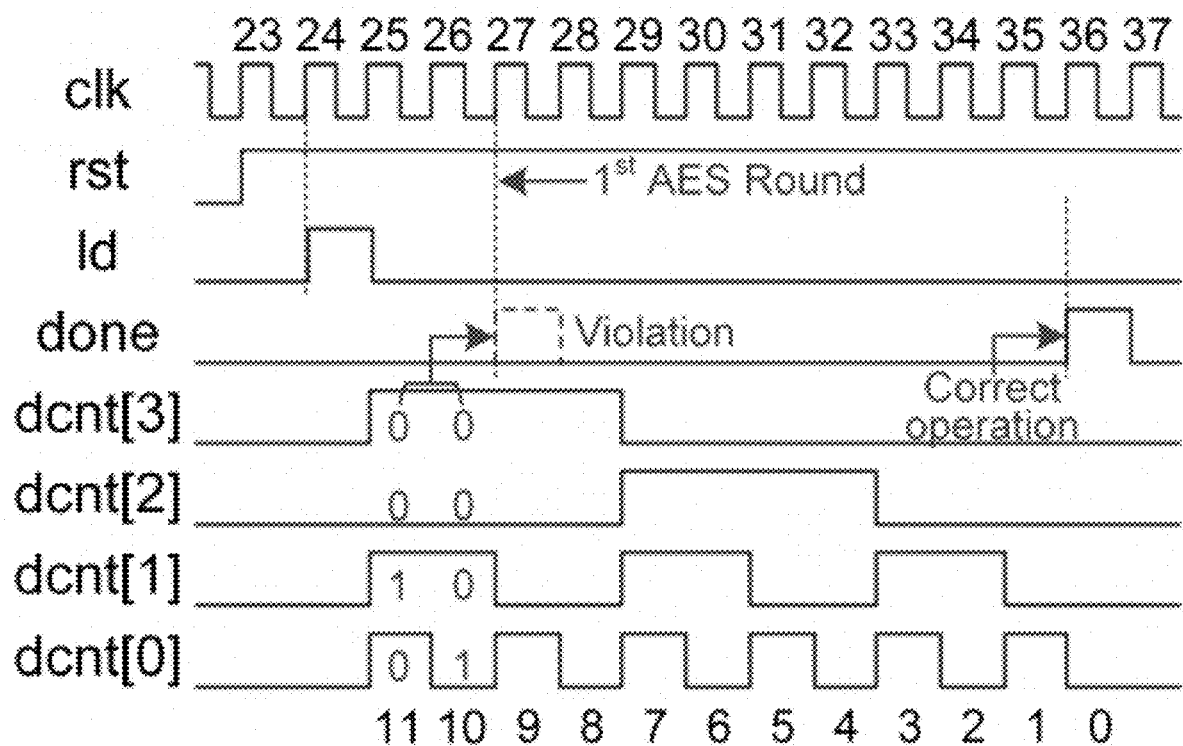

FIG. 7 illustrates an example waveform of sequential cells for SP1.

In accordance with common practice some features illustrated in the drawings cannot be drawn to scale. Accordingly, the dimensions of some features can be arbitrarily expanded or reduced for clarity. In addition, some of the drawings cannot depict all the components of a given system, method, or device. Finally, like reference numerals can be used to denote like features throughout the specification and figures.

DETAILED DESCRIPTION

Embodiments herein relate to a security property-driven vulnerability assessment framework that bridges the gap between the need for automated security assessment tools against fault-injection attacks and the capability of existing computer-aided design (CAD) tools commonly used in practice.

There are a number of fault-injection techniques that have been developed in order to maliciously alter the correct functionality of a computing device. In the case of non-invasive fault-injection attacks, which are inexpensive and are employed more frequently by attackers than other attacks, one can perform clock or voltage glitching or apply electromagnetic (EM) fields. For semi-invasive attacks, one can apply optical fault-injection techniques. Finally, in the case of invasive attacks, active fault-injections can be done by physical probing. The most common fault-injection techniques are briefly discussed below.

Figure 1A:
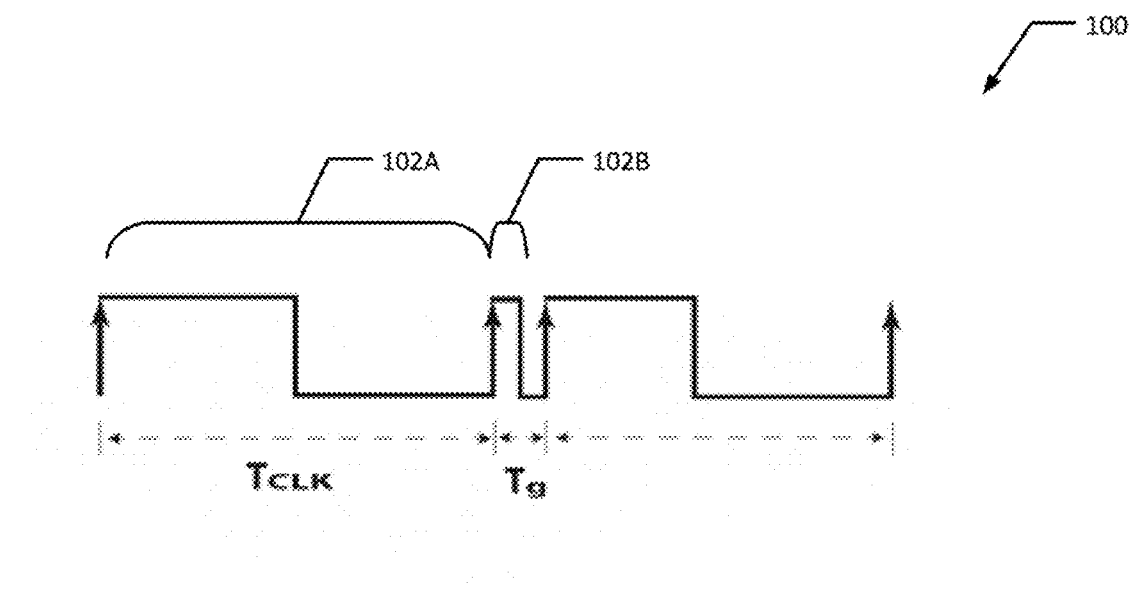
FIG. 1A illustrates an example glitching of a clock cycle by way of premature toggling of a clock signal.
Figure 1B:
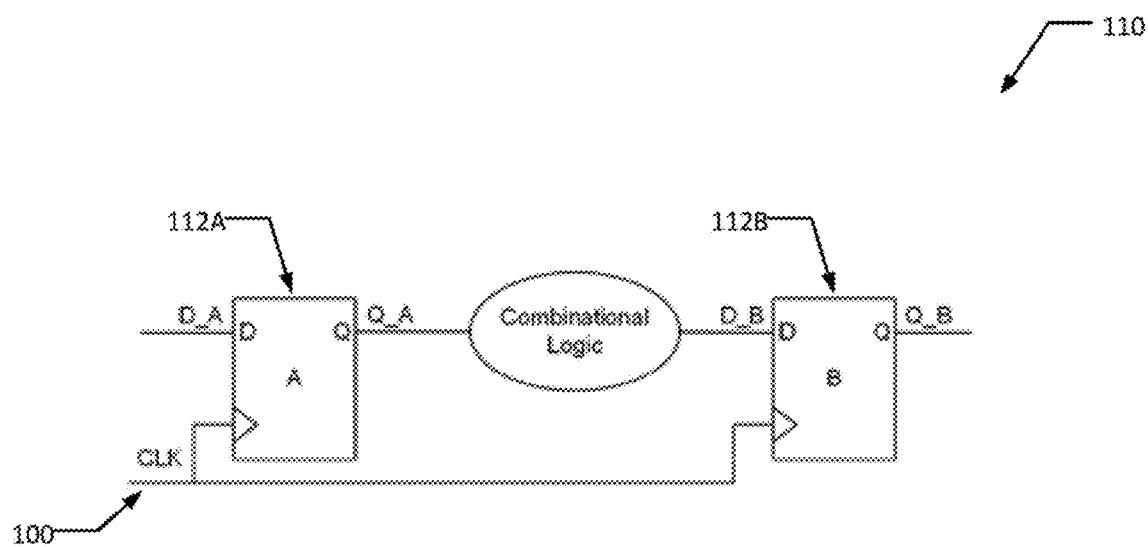
FIG. 1B illustrates an example sequential logic path.

1) Clock Glitching: One very low-cost and non-invasive technique to inject faults is to tamper with the clock signal to cause either setup or hold time violations. For example, the length of a clock cycle can be shortened by driving a premature toggling of the clock signal. FIG. 1A illustrates an example of a clock signal 100 that has been faulted with a shortened clock cycle. For example, a first illustrated clock cycle 102A of the clock signal 100 spans a time period $T_{CLK}$; however, a second clock cycle 102B has been prematurely toggled to span the time period $T_g$. In the illustrated embodiment, the time period $T_g$ spanned by the second clock cycle 102B that is prematurely toggled is significantly shorter than the time period $T_{CLK}$, which the second clock cycle is expected to span. Generally, a clock signal 100 can be glitched to cause a clock cycle 102 to have a significantly shorter length or a significantly longer length. FIG. 1B shows a typical sequential logic path 110 that involves the clock signal 100 and including two registers 112 or two flip-flops. In normal operation, the clock cycle ($T_{CLK}$) should be longer than the maximum path delay (r) of the combinational logic. However, when a clock glitch occurs, $T_g$ is less than τ, so a subsequent or second register 112B may capture the wrong (e.g., premature) data from the combinational logic, in which a fault is injected and will propagate in the circuit. Such a glitch in a processor can result in skipping an instruction or storing incorrect data in the memory modules. In addition, a clock glitch may cause the wrong data to be latched in flip-flops or registers 112. For example, if one bit of the key is not latched correctly by the key register in a crypto engine, this key bit can be deduced by comparing the faulty and the correct output of the crypto engine. Such faults are transient so that they can be injected without any footprint of tampering.

2) Voltage Glitching: Another low-cost technique is tampering with the power supply of a device. For example, one can run the chip with a depleted power supply so that some high threshold voltage transistors would never be open, thus transient faults are injected in the device. Another method is to leverage power spikes so that the setup time requirement of flip-flops may be violated similar to clock glitching, which can cause a processor to skip an instruction or a crypto engine to skip a round of encryption/decryption. This fault-injection technique is commonly utilized to tamper with a program counter, or a loop bound. Usually, voltage and clock glitching are used together to increase the possibility of setup time violation of flip-flops.

3) Electromagnetic (EM) Manipulation: An external electromagnetic field can also be exploited to inject faults. It can cause malfunctioning of a chip or flip memory cell(s). Eddy currents on the chip surface can be induced by the EM field, which can cause a single-bit fault. For example, a gas-lighter can be used to inject EM faults at a very low cost. The single-bit fault injected by EM can be used to facilitate the propagation of secret data, e.g., keys, to observable nodes.

Figure 2:
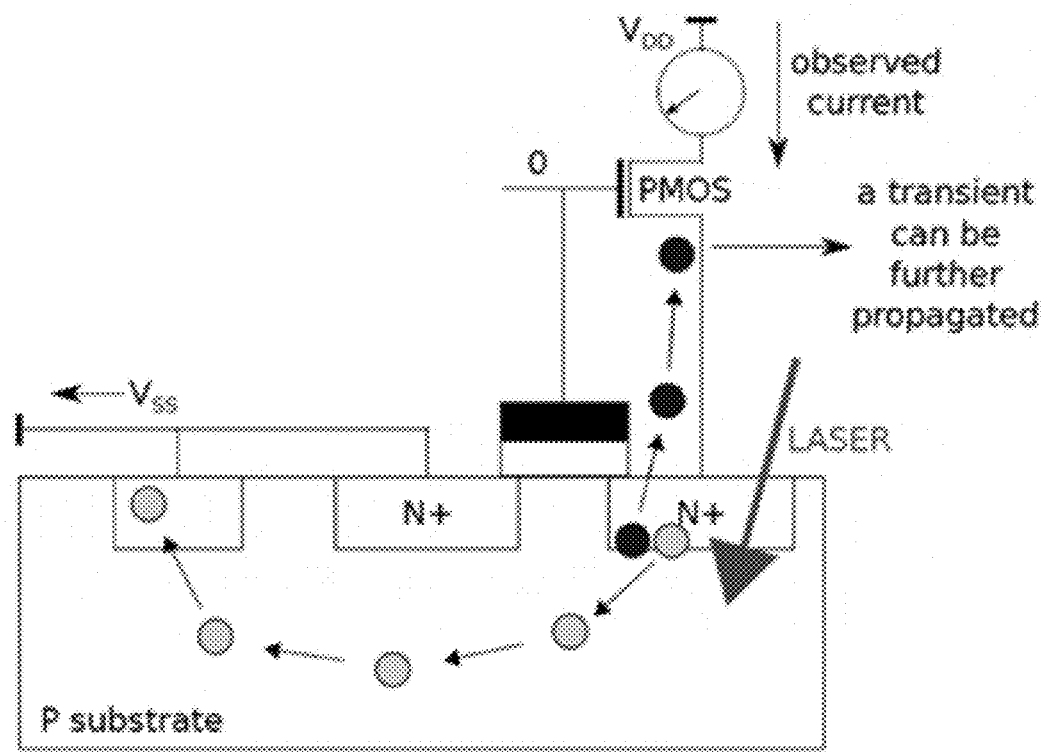
FIG. 2 illustrates an example impact of a laser on a transistor.

4) Light and Laser: A strong and precisely focused light beam or laser can be exploited to induce alterations in one or more logic gates. As shown in FIG. 2, a laser can create electron-hole pairs at the drain of a NMOS and thus create a current pulse. The current pulse will create a voltage pulse that can be further propagated in the circuit. For example, by targeting one transistor in static random-access memory (SRAM) cell, the cell can be flipped up or down at will. Hence, it is possible for attackers to flip one of the key bits loaded in the cache and deduce the value of that key bit by comparing the output of a crypto process. However, the spot size of the light is physically limited by the wavelength of the photons. It is no longer possible to hit a single SRAM cell using the current optical technologies since the width of the gate dielectric in the advanced technology nodes is now an order of magnitude smaller than the shortest wavelength of visible light. However, it does not necessarily imply the inability to inject a single-bit fault. Injecting a single-bit fault in a reproducible way has been demonstrated, despite the fact that the optical precision of the equipment was not able to target the smallest features of the chip.

5) Focused Ion Beam (FIB): The most accurate fault-injection technique uses a focused ion beam, which is a powerful instrument commonly used in the development, manufacturing, and reworking (editing) of semiconductor devices and integrated circuits (ICs). FIBs use ions at the low beam and high beam currents for imaging surface topology and site-specific milling/deposition, respectively. These capabilities allow designers to cut or add traces to the substrate within a chip, thereby enabling them to redirect signals, modify trace paths, and add/remove circuits. An attacker can use FIB to build a conducting path from chip surface to the internal net so that signals carried on the net can be extracted through this path (probing attack) and transient faults can be injected through this path as well (fault-injection attack).

Countermeasures evolve over time with the sophistication of fault-injection attacks. Since any countermeasure comes at a cost, in practice, they are selected with a good balance between overhead and security. In fact, many countermeasures are developed to make an attack sufficiently expensive for the attacker but not impossible. There are two major categories of countermeasures to protect a design against fault-injection attacks: intrusion detection and error detection.

1) Intrusion Detection: Countermeasures in this category are developed to detect any attempted tampering with the device and make the device physically inaccessible. They are developed to prevent a specific fault-injection technique. One notable example is using shields (passive or active), in which wire mesh is used to cover a part of or the entire chip to detect an optical fault or probing attacks. In addition, analog sensors can be applied in the chip to detect different fault-injection attacks. For example, light sensors and frequency detectors are used to detect optical fault-injection and clock glitching, respectively. The main drawback of the intrusion detection-based countermeasures is their high cost with large overhead and design efforts.

2) Error Detection: This approach modifies the design to allow the detection of injected faults at the algorithm level. One common method is concurrent error detection (CED), which can check the correctness of the algorithm by introducing redundancy. Typically, there are three types of redundancy in terms of resources: hardware, time, and information. As an example, hardware redundancy indicates adding extra hardware into the device to either detect or correct the impacts of the faults injected. The most common example is the triple modular redundant (TMR) structure which has three identical modules whose outputs are voted for correct functionality. Time redundancy can also be utilized to detect faults by re-running the same process on the same hardware. However, these approaches introduce at least 3×/2× area/performance overhead, respectively, which is too high to be practical for large-scale complex designs. As another example, information redundancy is based on error detection codes (EDCs) or error correction codes (ECCs), which may require a smaller overhead. The main drawback of the EDC/ECC based countermeasures, however, is possible lower fault coverage because not every combination of errors can be detected. For example, parity-based EDCs are capable of detecting any fault that consists of an odd number of bit errors; however, an even number of bit errors occurring in a single byte will not be detected.

Embodiments herein address the vulnerability assessment of common fault-injection attacks (e.g., clock glitch or laser) at gate-level. An adversary's objective is to tamper with security-critical locations in the design using one of the fault-injection techniques to violate targeted security properties of the design, such as confidentiality or integrity. To offer a comprehensive solution, embodiments herein may assume a strong attack model where the adversary has full gate-level information of the design from various sources, such as untrusted foundry, performing reverse engineering, stealing the IP, or cooperating with a rogue employee in the design house. Embodiments herein may also assume that the attacker is able to achieve the highest theoretical resolution that each fault-injection technique can perform, e.g., clock glitching can inject a fault in a specific register by extending the data path delay of that register. Therefore, the actual vulnerable locations from a practical fault-injection attack (e.g., lower resolution) standpoint would always be a subset of the identified critical locations. Hence, the actual resilience of the design against fault-injection attacks may be stronger than the assessment provided by the present framework.

I. COMPUTER PROGRAM PRODUCTS, SYSTEMS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY COMPUTING ENTITY

Figure 3:
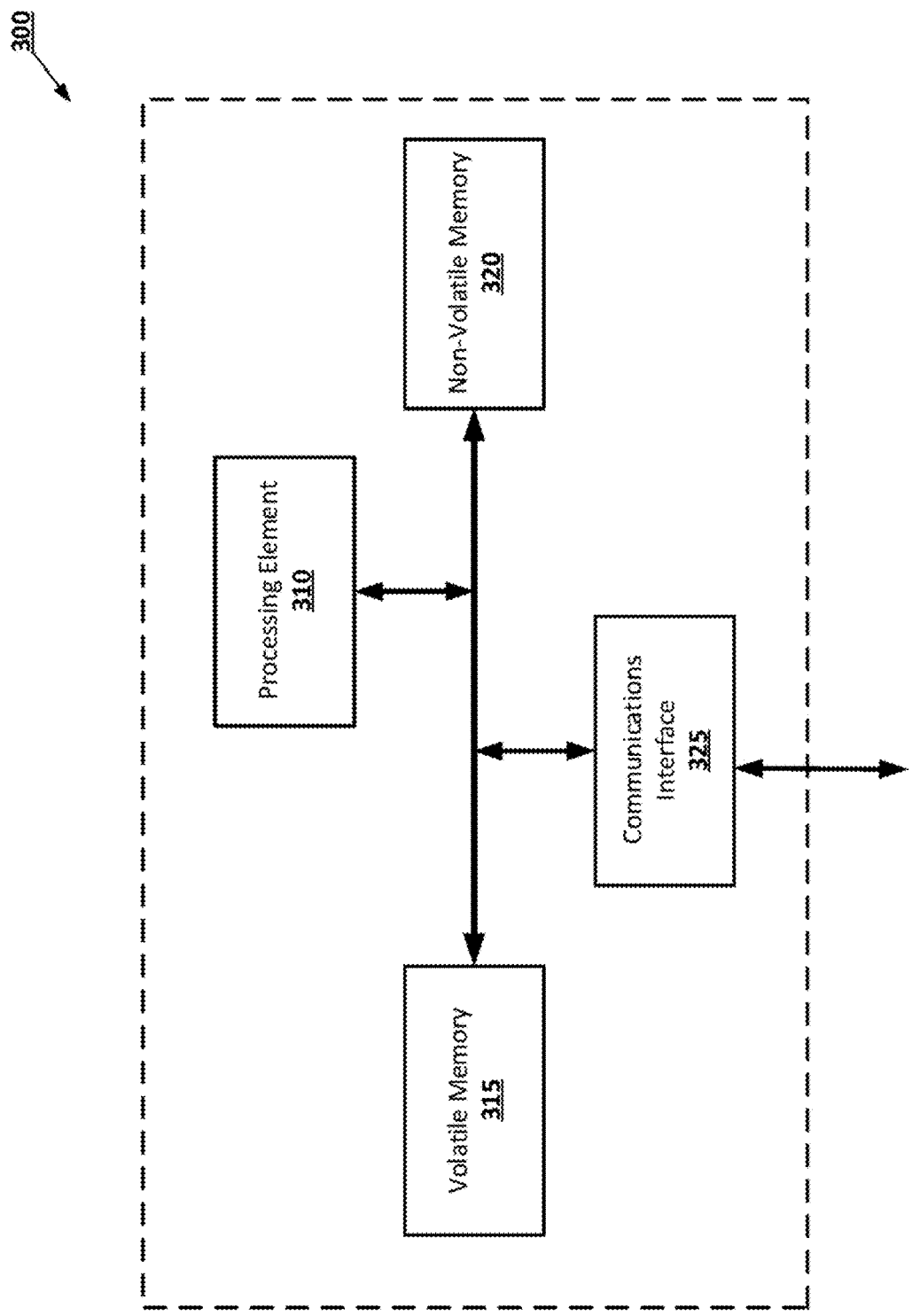
FIG. 3 illustrates a schematic of an example computing entity that may perform example operations of a security property-driven vulnerability assessment framework for a given IC design, in accordance with various embodiments of the present disclosure.

FIG. 3 provides a schematic of a computing entity 300 that may be used in accordance with various embodiments of the present disclosure. For instance, the computing entity 300 may be configured to perform example operations of a security property-driven vulnerability assessment framework as described herein to evaluate an IC design on a gate-level, including defining and/or characterizing fault models and a fault list, identifying critical locations of the IC design, detecting practical implementation of any possible faults. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

III. EXEMPLARY FRAMEWORK

Although fault-injection has received significant attention over the past decade as a strong threat on security critical designs and applications, there has unfortunately been no comprehensive study to formally model the faults, as well as their effects induced by different fault-injection techniques. In addition, during the propagation of the faults injected in the system, there are vulnerable locations that attackers expect to target to either cause confidentiality or integrity violations. For example, the attacker can inject faults during the initial round in the finite state machine (FSM) of the AES controller to skip the intermediate rounds and go to the final round directly so that the plaintext or key could be leaked. The faults can be injected directly at the FSM state registers or their fan-in cone cells. In the case of a microprocessor, an attacker may want to disable a password checking function, obtain access to the protected area of the memory, obtain access to the shared bus when sensitive information is being transferred, etc. Hence, it is critically important, in various embodiments, to define a set of security properties (SP) where fault-injection would enable the violation of those properties. Fault-injection is carried out for any or all of the three features of a secure device (e.g., confidentiality violation, integrity violation, or denial of service (DoS)). Similarly, security properties can also be defined to ensure confidentiality, integrity, and DoS are checked. If a fault injected in a design does not violate any of these secure design features, it will not be an effective fault-injection attack. Hence, to verify the effectiveness of fault-injection attack, embodiments herein relate to security properties. Embodiments of the present disclosure target faults on security properties in the design, making the analysis localized by focusing only on the part of the circuit for which the security property is being checked.

FIGS. 4A, 4B, 4C, 4D, and 4E illustrate example security property-driven fault-injection vulnerability assessment processes, for use with embodiments of the present disclosure. In embodiments, the computing entity 300 comprises means, such as processing element 305, memories 310, 315, and/or the like, for performing steps/operations described by blocks of the processes illustrated in FIGS. 4A-E. In embodiments, the critical locations to fault-injection attacks are identified by checking whether any security properties can be violated if the faults are injected at a set of locations. The more critical locations identified from the design, the more vulnerable the design is to fault-injection attacks. In various embodiments including the illustrated embodiment of FIG. 4A, a security property-driven fault-injection vulnerability assessment 400A takes a fault-injection technique specification 402, executable security properties 404, and a gate-level IC design 406 as inputs and provides a set of critical locations 408 as an output.

Figure 4A:
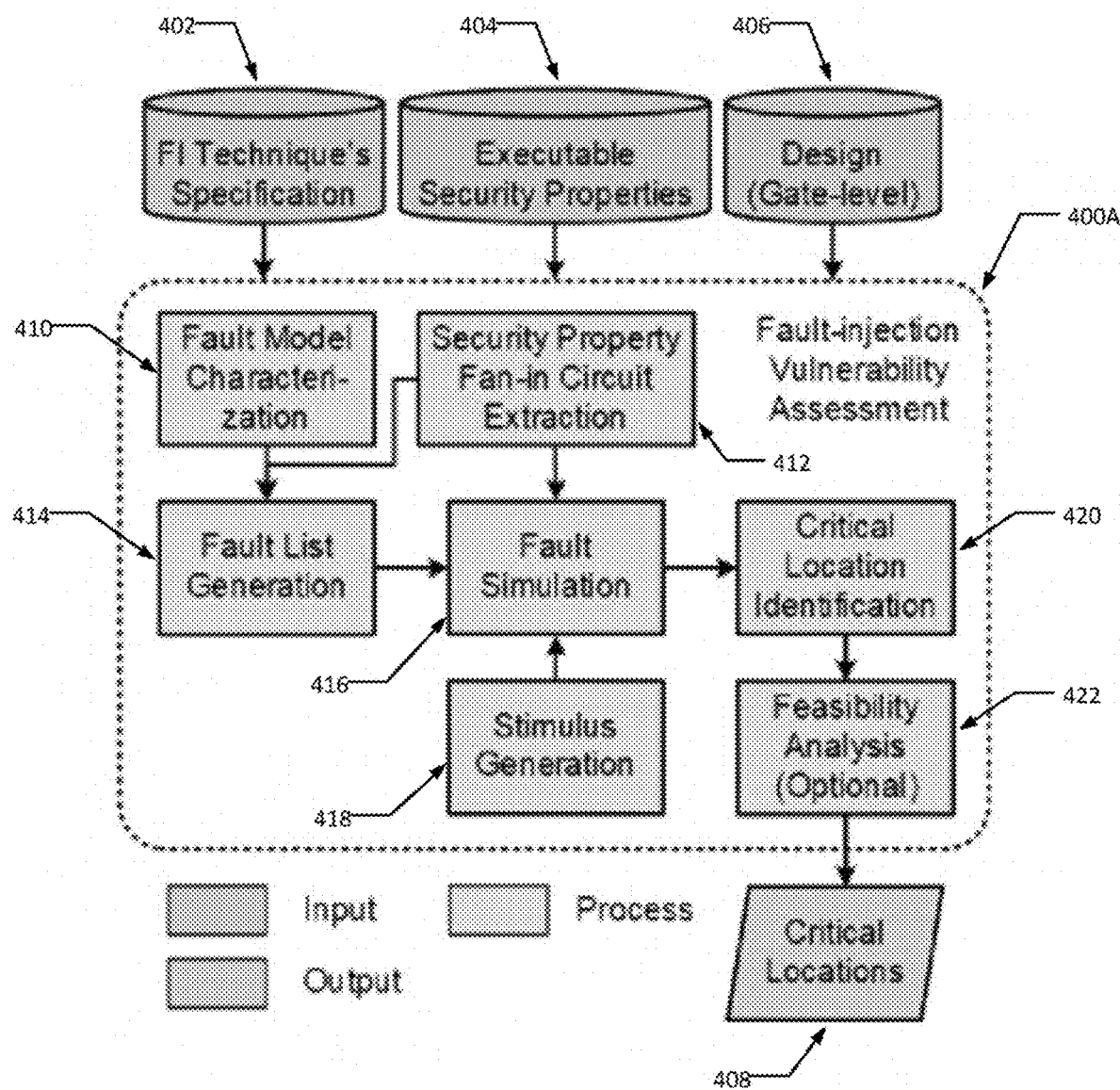

First, to map a specific fault-injection technique (e.g., clock glitch or laser) in the assessment, the fault models are characterized from the specification 402 of the targeted fault-injection techniques at block 410, as shown in FIG. 4A. In various embodiments, a fault list is then generated based on the fault model and the executable security properties 404 at block 414. Specifically, the executable security properties 404 may be used to determine a fan-in circuit within the IC design 406 at block 412, which is then used to generate the fault list. Then, the fault simulation is performed at block 416 for each fault of the fault list using the fan-in circuit extracted from the IC design 406. In various embodiments, the fault simulation is performed using stimuli generated at block 418. In various embodiments, the output of the fault simulation is used to identify critical locations within the IC design 406 at block 420. Finally, a fault feasibility analysis may be conducted at block 422 to check whether the faults can be practically implemented by the specific fault-injection technique. That is, the fault feasibility analysis may be performed at least to verify each critical location identified at block 420 and/or to select a subset of the identified critical locations based at least in part on feasibility. Thus, the security property-driven fault-injection vulnerability assessment 400A may output a set of critical locations 408 identified from the fault simulation (and determined to be vulnerable to faults that can be feasibly injected into the IC design 406).

Figure 4B:
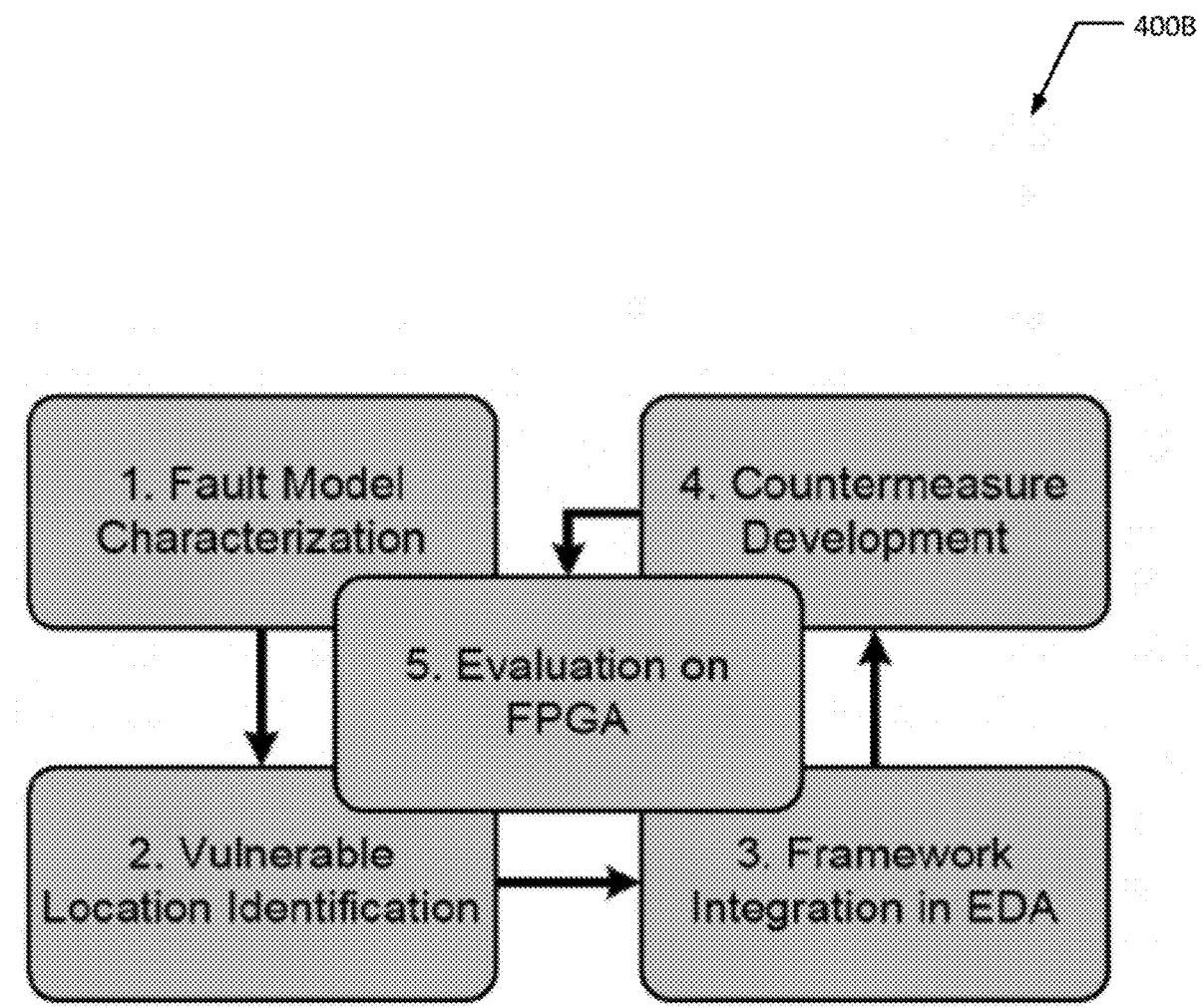

Using the identified critical or vulnerable locations, various further automated actions may be performed with the security property-driven vulnerability assessment framework. FIG. 4B illustrates another example security property-driven vulnerability assessment 400B. The example security property-driven vulnerability assessment 400B may be, in some example embodiments, implemented with security property-driven vulnerability assessment 400A illustrated in FIG. 4A. As shown in FIG. 4B, security property-driven vulnerability assessment 400B includes a first block for fault model characterization (which may be similar to block 410 illustrated in FIG. 4A), from which vulnerable or critical locations 408 may be identified at a second block (which may be similar to block 420 illustrated in FIG. 4A). The example security property-driven vulnerability assessment 400B may include various sub-blocks not explicitly illustrate to perform said first and second blocks, and these sub-blocks may correspond to and/or be similar to the blocks illustrated in FIG. 4A (e.g., blocks 412, 414, 416, 418).

As illustrated in FIG. 4B, the security property-driven vulnerability assessment frameworks includes various steps, operations, actions, and/or the like performed subsequent to the identification of critical locations 408. For example, the security property-driven vulnerability assessment 400B may be automated and integrated into an electronic design automation (EDA) process at a third block. That is, in some example embodiments, the critical locations 408 that are identified at the second block may be fed into an existing EDA process. Then, at a fourth block of the security property-driven vulnerability assessment 400B, countermeasures may be developed for the IC design 406 based at least in part on the identified critical locations 408. This may further be followed by testing and evaluation at a fifth block, such as to verify the identification of critical locations, to test the effectiveness of countermeasures in securing at least the critical locations, and/or the like.

Figure 4C:
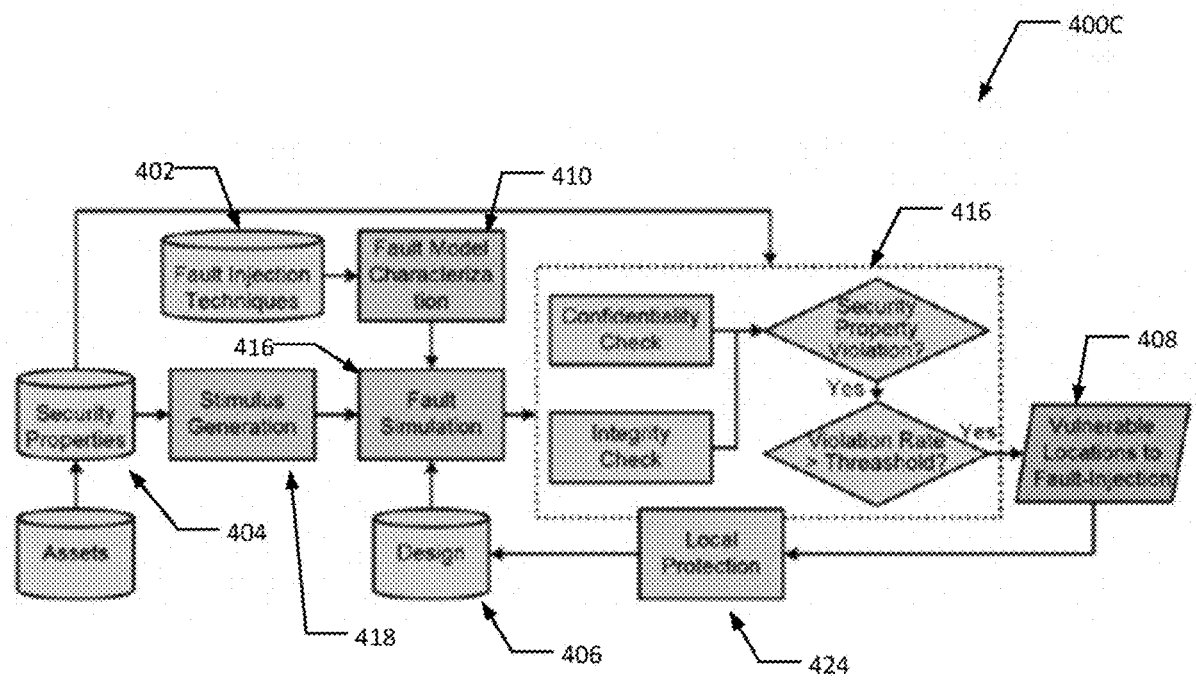

While not explicitly illustrated by FIG. 4B, this testing and evaluation may be iterative in nature, which is shown in FIG. 4C. FIG. 4C provides another example security property-driven vulnerability assessment 400C. As shown, the security property-driven vulnerability assessment 400C may include similar inputs and blocks as the previously described security property-driven vulnerability assessments 400A and 400B. In particular, FIG. 4C illustrates iterative performance of at least fault simulation 416, identification of critical locations 408 or vulnerable locations, and revision of the IC design 406 (e.g., with countermeasures, or generally protection 424). That is, in various embodiments, countermeasures or protections 424 may be added to the IC design 406 repeatedly, and the fault simulation may also be performed repeatedly. In some example embodiments, the fault simulation may be performed until some stopping criteria is satisfied. In the illustrated embodiment, for example, the fault simulation may include checking at least the confidentiality and/or integrity of the IC design 406 (or function thereof) in response to various stimuli and in light of faults of the fault list. At least the confidentiality and/or integrity of the IC design 406 may be checked with respect to the security properties 404. By checking the confidentiality and/or integrity of the IC design 406, a violation rate can be determined, and if the violation rate satisfies a pre-determined and/or configurable threshold, then a critical location 408 may be identified. Iterative performance of fault simulation and deployment of countermeasures or protections 424 within the IC design 406 enables determination of the effectiveness of said countermeasures and protections 424 against various faults.

Figure 4D:
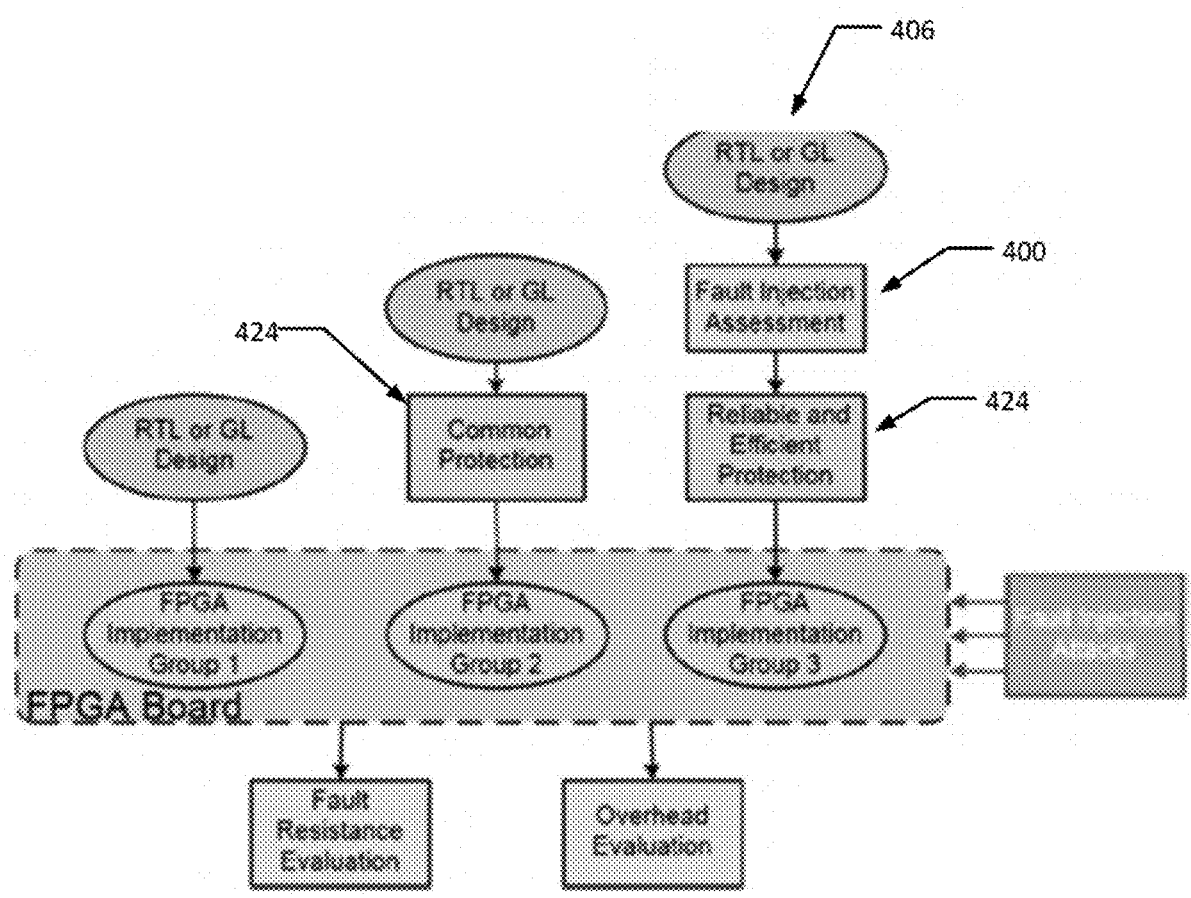

FIG. 4D illustrates implementation of example security property-driven vulnerability assessments 400 (e.g., 400A, 400B, 400C) with FPGAs. For example, a gate-level IC design 406 may be evaluated using a security property-driven vulnerability assessments, and countermeasures may be configured for the IC design 406 for reliable and efficient protection (e.g., at identified critical locations). The protected IC design 406 may then be implemented as a FPGA, at which faults may be injected to test the effectiveness of the protections 424 themselves, as well as of the fault simulation and critical location identification of the security property-driven vulnerability assessment 400. FIG. 4D illustrates additional implementation of IC designs 406 without performing security property-driven vulnerability assessments 400 and/or with common or standard protections 424, which may serve as controls or a comparison basis for determining at least the effectiveness of protections 424 at critical locations identified by the security property-driven vulnerability assessments 400.

Figure 4E:
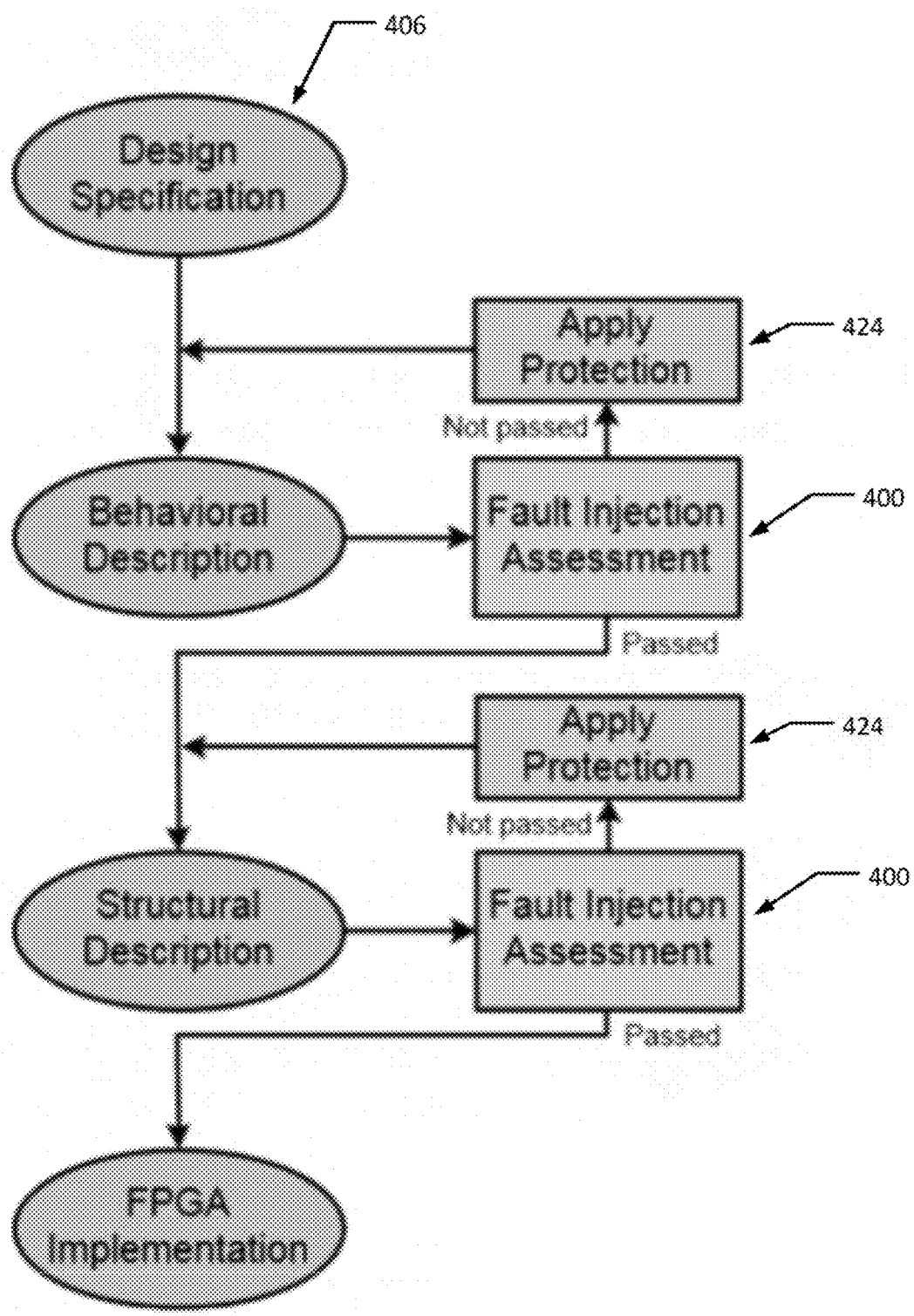

As generally described then, example security property-driven vulnerability assessments 400 may be performed in order to identify vulnerable or critical locations 408 of an IC design 406, which enables protections and countermeasures to be implemented into the IC design 406. FIG. 4E illustrates this implementation of security property-driven vulnerability assessments 400 for an IC design 406. First, protections 424 with respect to the designed behavior of the IC design 406 can be applied to the IC design 406 based on identification of vulnerable or critical locations from a performed security property-driven vulnerability assessment 400, in some example embodiments. Then, protections 424 with respect to the structure of the IC design 406 can be applied to the IC design 406 based on identification of vulnerable or critical locations from a another performed security property-driven vulnerability assessment 400. With the IC design 406 having protections 424 applied with respect to its behavior and its structure, the IC design 406 can then be implemented in an FPGA, in various example embodiments. In some example embodiments, the implementation of the IC design 406 in an FPGA can be further tested and evaluated, as described and illustrated in FIG. 4D.

A. Executable Security Properties

A security asset in a chip is a value that is worth protecting against different adversaries. It can be either tangible or intangible, such as passwords or one's fingerprint that defines the accessibility to a mobile phone. For integrated circuits, the asset could be encryption keys, obfuscation keys, device configurations, manufacture's firmware, communication credentials, etc. These assets should be properly protected against various attacks to avoid any secret leakage, illegal authentication, loss of profit, or reputation decline. Therefore, corresponding security properties (SP) specifying the secure utilization of the design are needed as a guidance to protect these assets and improve the scalability of the present security framework. Further, by tampering security-critical locations using fault-injection techniques, the attacker can violate the security properties and achieve privileges to leak/tamper asset information. Hence, the capability to violate one of the security properties can be utilized as the criteria to identify the critical locations. If the injected faults cannot violate any of the security properties, the underlying threat is much less of a concern compared to the faults that can violate properties. This can help with efficiently prioritizing the critical faults and locations, and to develop effective and resource-constrained local countermeasures.

As an input to the present framework, the appropriate definition and selection of security properties dictates the quality of the assessment because not all security properties are suitable for fault-injection vulnerability assessment. Therefore, a preference for identifying a security property subset herein is that the security property should be related to or can be violated by one of the fault-injection attacks. In various embodiments, security properties that are at the gate level of the IC design (e.g., instead of a layout level) may be preferably selected.

In addition, most of the conventionally known security properties are described at a high level (often using natural language) without detailed metrics. It may not be clear how to check if the security property is violated in the target level of abstraction of the design. Therefore, another preference for the security property herein is that the security property should be converted to one or more executable properties with explicit verification metrics. For example, the security property, "AES internal rounds cannot be skipped and directly jumped to the final round", can be converted to an executable one as described below.

SP1: The done signal that indicates the completion of ten AES rounds cannot be raised in the $1^{st}$ round.

In this case, the time (e.g., the $1^{st}$ AES round) and the location (e.g., the done signal) to check the security property violation are clear, which is more executable than the original one. Thus, in various embodiments, the security property-driven vulnerability assessment framework may comprise prompting a user to define a specific time and a specific location for a security property, receiving an indication of a specific time and/or a specific location (e.g., via user input), identifying a specific time and/or a specific location for a security property described in natural language using a natural language processing machine learning model, and/or the like.

If SP1 is violated, the $1^{st}$ round AES results would be leaked at the primary output in which the encryption strength provided by the AES algorithm would be significantly reduced. FIG. 5A shows the extracted fan-in circuit of the done signal which is a 4-bit counter. FIG. 5B illustrates example waveforms for monitoring SP 1. The done waveform is the correct waveform in the normal operation, while the done' waveform is the faulty waveform with the security property violated. That is, the done' waveform demonstrates the violation of SP1 with the completion of ten AES rounds being indicated in the first AES round. When the ld signal is raised at clock cycle 24, the keys and plaintext are loaded in the design and the AES encryption operation starts. It takes two clock cycles (25 and 26) to initialize the key expansion, and the $1^{st}$ AES round starts from the next cycle (cycle 27). In the normal operation, it takes ten rounds to encrypt the plaintext, so the done signal will be raised nine clock cycles after the $1^{st}$ round (cycle 36) as shown in FIG. 5B. However, when faults are injected in the security property fan-in circuit as shown in FIG. 5A and the done signal is raised three clock cycles after the AES keys are loaded (cycle 27), SP1 would be violated and the strength of the encryption algorithm will be compromised, in the example shown in FIG. 5B. Thus, explicit definition of security properties, such as via a specific time and a specific location as demonstrated in FIGS. 5A-B, enables efficient identification of faults that violate security properties.

B. Fault Model

There are many techniques to inject faults in a system, such as clock/voltage glitching, EM, laser beam, or FIB as discussed herein. The mechanism of fault generation from these techniques are fundamentally different. Hence, the format and impact of the faults injected by these techniques also differ significantly. For example, the faults injected by clock glitching may be global and random, while the faults injected by laser may be local and deterministic. Therefore, a comprehensive modeling of the existing fault-injection techniques is necessary to enable fast, reliable, and accurate assessment of the fault-injection vulnerability. Without such models, it is difficult to evaluate how these faults injected by different techniques would impact the circuit and security properties.

A fault model is a set of attributes characterized from the physical impact of the faults injected by a specific technique. It converts a physical event of fault-injection into a logical model. Using the logical model, the fault-injection and propagation in the digital circuit can be simulated and the impact of the faults can be analyzed for different fault-injection techniques. Different fault-injection techniques differ greatly in their ability to control the location and time (spatial and temporal) of the injected faults, in the number of bits affected, and the like. The list below shows fundamental attributes for fault model characterization herein.

Fault category: Faults can be classified into two major categories: (i) global faults where they are injected globally across the whole design, such as clock faults or voltage faults, and (ii) local faults where they are injected locally in a small portion of the design, such as laser or FIB.

Fault-injection location: Complete control spatially means a single specific cell in a design can be affected, e.g., using a high-resolution laser. Some control means a specific group of cells or a region can be targeted, but the sub-location within the specific group or region is unknown, e.g., faults can only be injected in sequential cells using the clock-based fault-injection technique. No control represents the faults that would be injected randomly among all cells in the design.

Fault-injection time: Complete control temporally indicates that the faults can be fully synchronized with the design or operation and can be injected at a specific point of time. Some control means a set of operations or clock cycles can be targeted, but not a specific one. No control represents faults that can only be injected at a random time.

Fault type: Faults can have different effects on the chip: stuck-at fault, bit-flip fault, set/reset fault, destructive fault (permanent damage), and the like.

Fault duration: Faults can have different duration: transient and permanent.

These attributes or aspects of faults are further described in Table 1, which describes examples possible values for each fault attribute or aspect. However, it will be understood that, in various example embodiments, faults may be modelled according to various other attributes and/or with the described attributes having different possible values. That is, Table 1 provides example and non-limiting values for different fault attributes.

TABLE 1

Modeling Faults with Fault Attributes

| Fault Attribute | Possible Values |
| --- | --- |
| Location | {no control, some control, complete control} |
| Timing | {no control, some control, complete control} |
| Number of bits | {single-bit, byte-size, word-size, variable-size} |
| Fault type | {stuck-at, bit flip, set/reset, random} |
| Duration | {transient, permanent, destructive} |

In addition, the specification (e.g., high or low resolution) of the fault-injection technique and the targeted technology node of the design could also impact the fault model. For example, a high-resolution laser can inject faults at any cells in a design with large feature size (complete control on fault location). However, a low-resolution laser may impact tens/hundreds of cells at a time in a design with small feature size (some control on fault location).

Table 2 shows the characterized fault model for different fault-injection techniques. Clock glitching, voltage glitching, and EM are classified as global fault-injection techniques, while laser and FIB are classified as local fault-injection techniques. Generally, local fault-injection techniques are more controllable in fault location and time. For fault type and duration, all fault-injection techniques evaluated in Table 2 can be modeled as bit-flip and transient, respectively.

TABLE 2

Fault model characterization.

| Technique | Fault Category | Spatial Control No | Spatial Control Some | Spatial Control Compl. | Temporal Control No | Temporal Control Some | Temporal Control Compl. | Fault Type | Fault Duration |
| --- | --- | --- | --- | --- | --- | --- | --- | --- | --- |
| Clock Glitching | Global | √ | √ | | | √ | √ | Bit-flip | Transient |
| Voltage Glitching | Global | √ | √ | | √ | √ | √ | Bit-flip | Transient |
| EM | Global | √ | √ | | √ | √ | √ | Bit-flip | Transient |
| Laser | Local | | √ | √ | | √ | √ | Bit-flip | Transient |
| FIB | Local | | | √ | | √ | √ | Bit-flip Stuck-at | Transient Permanent |

C. Fault List Generation

To implement the fault simulation, a detailed fault list must be generated with the exact time, location, type, and duration. The fault list is generated based on each security property and fault model. For most fault-injection techniques, the fault type can be modeled as bit-flip and the fault duration can be modeled as transient for one clock cycle, as shown in Table 2.

For the fault-injection time, the strongest attacker is assumed who has complete control on the clock cycle at which the fault would be injected (in practical scenarios, this assumption may not always hold true; therefore, the attack success is actually lower). The attack window would start with raising a control signal, like start, load, and the like, that launches a new round of operation in the design. The attack window would close when the security property is checked. Taking the SP1 mentioned herein as an example, the attack window opens when the ld signal is raised (clock cycle: 24) to start the AES and the attack window is closed in the first AES round (clock cycle: 27) at which the security property is checked, as shown in FIG. 5B. Therefore, if only one-time attack is considered in which the faults are injected only once, the fault-injection time falls in any one of the clock cycles from 24 to 27 for SP1. So, the fault-injection time ($T_f$) is 4, meaning there are opportunities in four clock cycles to inject fault.

For the fault-injection techniques that result in global faults, such as clock glitching or voltage glitching, in order to reduce the simulation workload, the potential fault-injection locations can be modeled only at sequential cells because only the latched faults at sequential cells are impacted, and their contents are propagated in the design. This is similar to single event upset (SEU) faults, but multiple events are also considered herein. For the fault-injection techniques that result in local faults, such as FIB or laser, the potential fault-injection locations can be any cells (sequential and combinational cells) in the design, which is similar to the union of single event upset faults and single event transient faults (SEU+SET), but multiple fault locations are also considered herein.

Practically, the actual concurrent fault locations in an attack can be any combination of cells in the potential injection locations. However, if the design size is large, it is not necessary to simulate all possible combinations of fault locations because the possibility of implementing a specific fault combination decreases exponentially with the increase in concurrent fault locations. For example, the possibility of injecting a fault at only one specific cell among 1000 cells might be $1 \times 10^{-3}$, or $$\left(1 \Big/ \binom{1000}{1}\right).$$

However, the possibility to inject concurrent faults at 20 specific cells among 1000 cells is $3 \times 10^{-42}$, or $$\left(1 \Big/ \binom{1000}{20}\right),$$

which is exponentially lower than the possibility to guess the key value of a 128-AES module at once ($1/2^{128} = 3 \times 10^{-39}$). Further, for some fault-injection techniques, like laser, the number of concurrent fault locations is also limited by the number of laser beams (typically, it is only one). Therefore, a small threshold can be set for the number of concurrent fault locations considered in the fault simulation. This threshold can vary depending on the fault-injection technique's specification, simulation capability, and the benchmark size. In some example embodiments, this threshold can be set to 1 or 2.

For SP1, first, the fan-in circuit of this security property (the fan-in circuit of the done signal) is extracted as shown in FIG. 5A. The RTL of the AES module is from OpenCores and the gate level netlist is synthesized using Synopsys Design Compiler with SAED32 nm library. Table 3 shows the general information of the extracted fan-in circuit. It is a small circuit, part of AES control logic. There are only three primary inputs associated with SP1: clk (clock), ld (key load), and rst (reset). The only output is the done signal which is the checkpoint of the security property. By checking when the done signal is raised, one would know whether the security property is violated.

TABLE 3

Fan-in circuit information of SP1.

| Input | Outputs | Nets | Sequential Cells ($N_s$) | Combinational Cells ($N_c$) | Total Cells ($N_t$) |
|---|---|---|---|---|---|
| 3 | 1 | 36 | 5 | 26 | 31 |

For a global fault-injection technique assessment, the potential fault-injection locations are modeled only at the output of sequential cells to minimize the fault simulation workload. As shown in Table 3, the number of sequential cells ($N_S$) in this circuit is 5. Since it is a small number of sequential cells, all possible combinations of these 5 locations are considered as fault-injection locations in the fault list. Thus, the concurrent fault threshold ($CF_{th}$) is set to 5. If the potential fault-injection locations are large, only one or two concurrent fault locations are considered, as discussed earlier. Hence, the total number of faults for global fault-injection technique assessment ($TF_g$) in the fault list is:

$$TF_g = T_f \times \sum_{i=1}^{CF_{th}} \binom{N_s}{i} = 4 \times \left[\binom{5}{1} + \binom{5}{2} + \binom{5}{3} + \binom{5}{4} + \binom{5}{5}\right] = 124.$$

$T_f$ represents the number of fault-injection time. For the local fault-injection technique assessment, the potential fault-injection locations are the output of all cells in the circuit. As shown in Table 3, the number of total cells ($N_T$) is 31 in total. As illustrated before, it is not necessary to consider all possible combinations of the potential fault-injection locations. Here, up to 4 concurrent fault locations ($CF_{th}=4$) are considered in this fault list and the total number of faults for local fault-injection technique assessment ($TF_l$) is:

$$TF_g = T_f \times \sum_{i=1}^{CF_{th}} \binom{N_T}{i} =$$

$$4 \times \left[\binom{31}{1} + \binom{31}{2} + \binom{31}{3} + \binom{31}{4}\right] = 145,824.$$

D. Fault Simulation

In the present framework, the fault simulation may be performed, in certain embodiments, using Z01X from Synopsys, which is a fast and comprehensive functional fault simulator. By injecting faults in the design, the attacker can achieve privileges to leak/tamper asset information. Hence, the critical locations of the design to fault-injection attacks should be identified to avoid security property violation. Protection of these critical locations with high priority ensures that the assets cannot be leaked/tampered and the security properties cannot be violated by fault-injection attacks.

In a fault-injection attack, the faults might be injected directly at locations where a property is checked (e.g., done signal in SP1) or in their fan-in circuit (e.g., FIG. 5A), if it is easier. Therefore, during fault simulation, faults may be injected at both locations based on the fault model characterized from the targeted fault-injection technique and the corresponding fault list, considering the security property, as illustrated herein. If the injected faults violate the security property, the fault simulation would capture this violation and mark the corresponding faults. The critical locations can be extracted from those faults. These critical locations should be properly protected using countermeasures against fault-injection attacks.

Different security properties may involve different portions of the design, which means the property can only be violated if the faults are injected in the specific portion of the design. In most cases, this portion would be the fan-in circuit of the location referred in the security property. For example, in the case of SP1, the security property can be violated only if the faults are injected in the fan-in circuit of the done signal. Therefore, to increase the efficiency of fault simulation, the fan-in circuit of the security property would be extracted, and the fault simulation would be performed on the extracted circuit only.

Besides the fault and the design implementation, violation of a security property also depends on the stimulus vector. With the same fault in a design, some stimulus can successfully violate the security property, but some others cannot because the toggling activities of internal signals vary from different stimulus. Therefore, by feeding different stimulus to the simulation with the same fault, the rate of the security property violation for the targeted fault can be calculated. Faults with zero security property violation rate can be defined as non-effective faults. Faults with non-zero security property violation rate can be defined as effective faults. Table 4 summarizes the terms used in the present disclosure and their definitions.

TABLE 4

Terminologies used in the paper and their definitions.

| Terms | Definitions |
| --- | --- |
| Non-effective faults | Faults with approximately zero security property violation rate (e.g., less than 0.1%, less than 0.5%, less than 1%) |
| Effective faults | Faults with approximately non-zero security property violation rate (e.g., greater than 0.1%, greater than 0.5%, greater than 1%) |
| Critical faults | Effective faults for which all associated fault locations are necessary for security property violation |
| Feasible faults | Critical faults that can be implemented by a setup-time based fault-injection technique |
| Critical locations | A set of locations within an IC design (e.g., a gate of an IC design) that has overlap with every critical or feasible fault and the set size is minimized |

If the extracted fan-in circuit of the security property is a part of the control logic (e.g., FSM), specific input patterns that are commonly used for the functionality of the control logic can be utilized as the stimulus in the fault simulation. For example, in SP1, since one input is the clock and the other two inputs are control signals, these signals are switching with a fixed pattern instead of random transitions. Therefore, only one specific pattern is applied as the input stimulus to the extracted fan-in circuit of SP1, as shown in FIG. 5B. If the extracted circuit is part of an arithmetical logic (e.g., arithmetic-logic unit (ALU)), random input vectors (e.g., including numerical values) could be used as the stimulus.

In various embodiments, once the security property, fault list, stimulus, and the security property fan-in circuit are available, the fault simulation can be performed. In various embodiments, any of the security properties, the fault list, stimuli, and security property fan-in circuits can be defined explicitly by a user (e.g., via user input) or automatically.

E. Critical Location Identification

When the fault simulation is done, it can be determined whether a fault in the fault list is effective at violating the target security property, and in various embodiments, the security property-driven vulnerability assessment framework involves iterating through the fault list to determine effectiveness of each fault (e.g., a SP violation rate for each fault). One fault can be associated with one or more fault locations. As an example shown in FIG. 6, its fault list is shown in Table 5. As observable, faults #1-3 only have one fault location, while faults #4-6 have two fault locations, and fault #7 has three fault locations. If an effective fault consists of two or more fault locations, not every fault location is necessarily contributing to the security property violation. In other words, injecting faults at a subset of the fault locations of an effective fault may still violate the security property. Therefore, faults with all fault locations contributing to the security property violation are defined as critical faults. For the example shown in FIG. 6, the following security property is considered: the output of cell C should not be 0.

In the illustrated embodiments, it is assumed (from demonstration) that faults can be injected at any combination of the output of cells A, B, and C. Table 5 shows the fault list and the identified critical faults in this case. Three possible fault locations (cell output: A, B, and C) result in 7 different faults considering all combinations of the three fault locations ($\Sigma_{i=1}^{3} \binom{3}{i}$). Except for faults #1 and #2, all other faults can effectively violate the security property. However, one can see that some fault locations are not critical to the property violation. For example, a single location fault at cell C (fault #3) alone can violate the security property. It is the critical contributor to the violation, so this fault is identified as a critical fault. Any other fault that contains the fault location at cell C (e.g., fault #5-#7) can violate the security property because of the existence of the fault at cell C, instead of the faults at other fault locations. They are effective faults but not critical faults. Another critical fault identified in this case is the fault at location A+B (fault #4: concurrent fault at A and B). Although there are 5 effective faults in this example, only 2 can be identified as critical faults.

TABLE 5

Fault list and critical faults.

| Fault Index (#) | Location (Cell output) | Effective Fault | Critical Fault |
| --- | --- | --- | --- |
| 1 | A | No | No |
| 2 | B | No | No |
| 3 | C | Yes | Yes |
| 4 | A + B | Yes | Yes |
| 5 | A + C | Yes | No |
| 6 | B + C | Yes | No |
| 7 | A + B + C | Yes | No |

Taking into consideration that every location in a critical fault is vital to the violation of the security property, if the fault cannot be injected at one of the locations in a critical fault (e.g., location A of fault #4 in Table 5), the corresponding security property will never be compromised by the attacker. Therefore, for all critical faults, if at least one fault location is properly protected, all critical faults cannot be implemented. Hence, the critical location is defined as a set of locations that covers all critical faults and the set size is minimized.

Table 6 shows one example of critical locations identified from critical faults in a different example IC design. In this example, there are 4 critical faults with different fault locations that every fault location is contributing to the security property violation. Without the critical location identification, all 7 fault locations (H-N) would have to be protected against fault-injection attacks. However, location H can be identified as critical location with the set size being only one, as location H is common to all critical faults. Therefore, by only protecting this one critical location, all the 4 critical faults would never be enabled. Another location set {I, J, K, M} covers all critical faults as well. However, the set size is 4, which is not the minimal size. Hence, this location set is not the critical location. Through minimization of critical location set size, countermeasures can be efficiently deployed with maximum protection or coverage.

TABLE 6

Example critical location identification

| Critical Fault Index (#) | Location (Cell Output) | Critical Location |
| --- | --- | --- |
| 8 | H + I | H |
| 9 | H + J | |
| 10 | H + K + L | |
| 11 | H + M + N | |

F. Fault Feasibility Analysis

In the fault simulation, each fault can be injected precisely at the desired location and time. However, in practice, even with the fault model characterization, not every fault in the fault list can be executed on physical devices by the specific fault-injection technique since different techniques may have different requirements and limitations on where and when the fault can be injected. Therefore, the fault feasibility analysis is performed for specific fault-injection techniques, so that the critical faults and critical locations identified herein make sense in a practical attack.

This step is optional in the present framework because of two reasons. First, the fault-injection techniques are always evolving where some infeasible faults/attacks today may become possible in the near future. Hence, it is desirable to always protect critical locations against all critical faults as long as the protection overhead is acceptable. Additionally, the current assessment is performed at the gate-level design phase. It might be difficult to evaluate the feasibility of some fault-injection techniques at the gate-level before the following design phases (e.g. physical design). For example, the feasibility of a fault using laser-based fault-injection technique is mainly dependent on the layout information of the design, which is unknown at the gate-level design stage. Hence, for some fault-injection techniques, such as laser, the fault feasibility analysis cannot be performed for the specific critical faults. However, some design suggestions can be made for later design phases (e.g., physical design) to make the critical faults infeasible.

1) Feasibility Analysis of Setup-time Based Fault-Injection Techniques: Many fault-injection techniques, such as clock glitching or voltage depletion, are leveraging the setup-time violation of flip-flops to inject faults. Clock glitching reduces the clock period and the voltage depletion extends the path delay so that the setup time constraint of the flip-flops can be violated in both scenarios. However, the setup time violation cannot guarantee a bit-flip fault to be injected into the design. Essentially, when the setup time is violated, the flip-flop will latch the value of the previous clock cycle. If the value of the current clock cycle in normal operation is consistent with the previous cycle, the flip-flop will still latch the correct value even if the setup time is violated. Therefore, the bit-flip fault can only be injected in flip-flops when a state transition is expected in normal operation.

Considering the sequential logic path 110 in FIG. 1B and assuming the combinational logic is only delay buffers, the correct value of register 112A and register 112B in normal operation is shown in columns 2 and 3 of Table 7. There is only one transition for register 112A at cycle T, and it is propagated to register 112B in the next cycle (T+1). Column 4 of Table 7 shows the latched value in register 112B if its setup time is violated in the corresponding clock cycle. It can be seen that only the value at cycle T+1 is different from the correct value in column 3, so that fault can only be injected at cycle T+1. In other cycles, even though the setup time of register 112B is violated, it can still latch the correct value because there is no transition at that cycle. Therefore, for register 112B in this example, fault at cycle T+1 is a feasible fault, and faults at other cycles are infeasible because they cannot be practically implemented by the setup-time based fault-injection technique.

TABLE 7

The latched value of registers 112 in FIG. 1B.

| Clock Cycle | Register 112A | Register 112B | Faulted Register 112B |
| --- | --- | --- | --- |
| 0~T − 1 | 0 | 0 | 0 |
| T | 1 | 0 | 0 |
| T + 1 | 1 | 1 | 0 |
| T + 2~End | 1 | 1 | 1 |

2) Design Suggestions against Local Fault-injection Techniques: For those local fault-injection techniques, such as laser or FIB, the fault's feasibility depends on the physical implementation of the design, such as place and route. One limitation of these local fault-injection techniques is the number of laser beams/focused ion beams. Typically, there is only one laser beam available for fault-injection. Hence, if a critical fault requires two or more concurrent fault locations (e.g., cell A and cell B), by placing cell A and cell B with a far enough distance that is larger than the maximum spot size of the laser, this critical fault would never occur by the laser. Such design suggestions can be made in the present framework, so that all critical faults with two or more locations would never be implemented using the laser with only one beam.

Another limitation of these local fault-injection techniques is the need for the best resolution (minimum spot size) for advanced technology nodes. Taking laser as an example, the resolution R is a function of wavelength $\lambda$: $R=\lambda/(2 \text{ NA})$, NA: Numerical Aperture (in air<1).

Typically, a near infrared light ($\lambda \approx 1$ μm) is used for laser fault-injection from the backside. Hence, R is at best around 500 nm. Table 8 shows the technology trend targeted in 2013. From Table 8, it can be seen that for the latest technology nodes with pitch size<100 nm, tens or even hundreds of cells would be involved in one laser spot, which means if the attacker is targeting only one cell, it would be very challenging to inject fault only at that cell, as all the cells around the target cell within the laser spot would potentially experience injected faults. Hence, if a critical fault at location A can violate a security property while a fault at location A+B cannot violate the security property, by placing cell A and cell B closely enough to make the faults injected at these two cells at the same time, the threat from this critical fault can be mitigated. Further, fan-out cells of cell A can be placed closely around cell A, so the propagation of the fault at cell A may be blocked by the fault injected at its fan-out cells. By creating such placement constraints, the critical faults with only one fault location can be mitigated significantly.

TABLE 8

International Technology Roadmap for Semiconductors (ITRS) 2013.

| Node | Pitch | Year |
|---|---|---|
| 16 nm | 80 nm | 2013 |
| 10 nm | 64 nm | 2015 |
| 7 nm | 50 nm | 2017 |
| 5 nm | 40 nm | 2019 |
| 3.5 nm | 32 nm | 2021 |
| 2.5 nm | 26 nm | 2023 |
| 1.8 nm | 20 nm | 2025 |

After the fault-injection vulnerability assessment is done, local countermeasures can be developed to protect the identified critical locations. This will ensure all security properties evaluated in the assessment would never be violated, and also the protection overhead would be significantly reduced because critical locations should be a very small portion of the design. In addition, because processes of the example security framework according to embodiments herein are performed at early stages of the IC design flow, the design might be altered to address these vulnerabilities by using different FSM encoding, applying different timing constraints, and the like.

IV. EXEMPLARY STUDIES

In this section, example embodiments of the present security framework are evaluated on different benchmarks. The experiments are designed to show how efficient the assessment flow is and how many critical locations to fault-injection attacks can be identified in the design. For each benchmark, its gate-level netlist, as well as the corresponding security properties are considered for the evaluation of embodiments herein.

All benchmarks used herein are from OpenCores. They are described in register-transfer level (RTL) code and synthesized using Synopsys Design Compiler with SAED 32 nm technology library. The fault simulation is performed using Synopsys Z01X.

A. SP1 Results

As an example across the present framework, the SP1 definition was described above; the AES benchmark is synthesized with 10290 cells in total; the fan-in circuit of SP1 is extracted whose information is shown in Table 3; the fault list is generated with 124 global faults and 145,824 local faults, as illustrated herein; one pattern is applied to the fault simulation as illustrated herein and FIG. 5B.

Table 9 shows the fault simulation results for SP1. For the global fault-injection technique assessment, 20 effective faults that can violate SP1 are achieved directly from the fault simulation. Among these effective faults, 3 critical faults that are actually contributing to the security property violation are identified, as shown in Table 10. Only one feasible fault that can be implemented by setup-time-violation-based fault-injection technique is identified from the feasibility analysis. Therefore, only one critical location is identified from the feasible fault, which is 0.01% (1/10290) of the AES module, so that by protecting this critical location, the feasible fault would never be able to cause violation. For the local fault-injection technique assessment, the feasibility analysis is not performed because the layout information of the design is not available at the gate-level assessment. 6 critical locations are identified, which is 0.058% (6/10290) of the AES module. Therefore, by protecting these 6 critical locations, all critical faults would not be enabled using local fault-injection techniques.

TABLE 9

Fault simulation results for SP1.

| Fault Category | Total Faults | Effective Faults | Critical Faults | Feasible Faults | Critical Locations | % in AES |
|---|---|---|---|---|---|---|
| Global | 124 | 20 | 3 | 1 | 1 | 0.010% |
| Local | 145,824 | 9,563 | 83 | NA | 6 | 0.058% |

TABLE 10

Critical faults for global fault simulation.

| Critical Fault Index (#) | Time (clock cycle #) | Location | Feasible Faults |
|---|---|---|---|
| 1 | 27 | Done | No |
| 2 | 25 | dcnt[3] + dcnt[0] | Yes |
| 3 | 26 | dcnt[3] + dcnt[1] + dcnt[0] | No |

To understand how the identified critical faults can violate SP1, the 3 critical faults for global fault simulation are extracted. Table 10 shows the time (e.g., clock cycle #) and location of the 3 critical faults. The 5 sequential cells in the circuit are done_reg and dcnt_reg[3:0] whose outputs are done and dcnt[3:0], respectively. dcnt_reg[3:0] is the output of a 4-bit counter that counts the AES round. The waveform of output signals of the 5 sequential cells is shown in FIG. 7. When the ld signal is raised, the counter is set to 11 (b'1011) in the next cycle. Then, it is counting down from 11 to 0. When the counter is 1 (b'0001), the done signal will be raised in the next clock cycle.

The security property violation requires that the done signal is raised at clock cycle 27. Therefore, it is easy to understand if the fault can be injected directly in done at cycle 27, the security property will be violated, which is the case of fault #1 in Table 10. In addition, if the counter is set to 2 (b'0010) at cycle 25, the done signal will be raised two cycles later (cycle 27). Similarly, if the counter is set to 1 (b'0001) at cycle 26, the done signal will be raised one cycle later (cycle 27). In both cases, the security property is violated as well and these two cases are implemented by faults #2 and #3 in Table 10, respectively. Therefore, the fault simulation results are correct and consistent with the circuit logic analysis. Further, only fault #2 is feasible by setup-time-violation-based fault-injection techniques because there are transitions for dcnt[3] and dcnt[0] at cycle 25, as shown in FIG. 7.

B. Security Properties in FSMs

Many fault-injection attacks focus on analyzing the fault effects on data paths. However, finite state machines in the control path are also vulnerable to fault-injection attacks. The security of an SoC can be compromised if the FSMs controlling the SoC are tampered by fault-injection attacks. Hence, the security properties to protect FSMs should be considered and the FSM's vulnerability to fault-injection attacks should be assessed using embodiments herein. Below, two security properties in the FSM of AES and RSA controllers are evaluated, respectively.

1) FSM in AES Controller: The FSM of AES controller is composed of five states: 1) Wait Key; 2) Wait Data; 3) Initial Round; 4) Do Round; and 5) Final Round. During Wait Key and Wait Data states, the secret key and plaintext are loaded into the AES data path, respectively, while during Initial Round and Do Round states, ten rounds of AES occur. After ten rounds, the Final Round state is reached and the result is latched to the output registers. One possible attack can be implemented against this FSM as follows: if an attacker can inject a fault and gain access to the Final Round directly from Initial Round without going through the Do Round state, then premature results will be stored, which significantly weakens the encryption strength of the AES algorithm and potentially leaks the secret key. Therefore, for this FSM, one security property can be defined as:

SP2.1: In the FSM of AES controller, Initial Round state cannot directly jump to Final Round state without going through Do Round state.

2) FSM in RSA Controller: RSA is a widely used asymmetric encryption algorithm.

The FSM of the RSA controller module consists of seven states: 1) Idle; 2) Init; 3) Load1; 4) Load2; 5) Multiply; 6) Square; and 7) Result. Here, the attacker's objective would be to bypass the intermediate rounds of Square and Multiply states and access the "Result" state to obtain the premature result of RSA encryption. Therefore, for this FSM, one security property can be defined as:

SP2.2: In the FSM of RSA controller, Square and Multiply states cannot be bypassed to Result state.

The AES benchmark used in this experiment differs from the one used for SP1. Table 11 shows the information of the extracted fan-in circuit benchmark for different security properties. The only difference between AES FSM 1 and AES FSM 2 is from the different FSM encodings; same for RSA FSM 1 and RSA FSM 2.

TABLE 11

Security property fan-in circuit information.

| Benchmark | Security Property | Input | Output | $N_S$ | $N_C$ | $N_T$ |
|---|---|---|---|---|---|---|
| AES FSM 1 | 2.1 | 3 | 3 | 7 | 24 | 31 |
| AES FSM 2 | 2.1 | 3 | 3 | 7 | 20 | 27 |
| RSA FSM 1 | 2.2 | 2 | 1 | 7 | 23 | 30 |
| RSA FSM 2 | 2.2 | 2 | 1 | 7 | 21 | 28 |
| AES KS | 3.1/3.2 | 130 | 128 | 140 | 2167 | 2307 |

Table 12 shows the results of the fault simulation. As shown, in the global fault simulation of AES FSM 1, there are no feasible faults, which indicates the FSM is resistant against setup-time violation-based fault-injection techniques. However, for AES FSM 2, there is one feasible fault. Similar results are achieved for the global fault simulation of RSA FSM 1 and RSA FSM 2 in which there is zero and one feasible fault, respectively. Hence, inappropriate FSM encoding scheme can bring additional vulnerability to the design against fault-injection attacks. For the local fault simulation of both AES FSM 1 and AES FSM 2, seven critical locations are identified, which indicates, by protecting these seven critical locations in the AES, the security property would never be violated and the threat from fault-injection attacks is significantly mitigated. For the local fault simulation of RSA FSM 1 and RSA FSM 2, there are eight and seven critical locations identified, respectively. Therefore, for both SP2.1 and SP2.2, less than 0.1% of the cells in AES/RSA are critical to fault-injection attacks. By protecting these critical locations, the threat from fault-injection attacks can be significantly mitigated and the protection efficiency could be much higher than conventional approaches in which the whole FSM or even the whole AES/RSA is protected.

TABLE 12

Fault simulation results.

| Benchmark | Security Property | Stimulus | Fault Category | # of Concurrent Fault Locations | Total Faults | Effective Faults | Critical Faults | Feasible Faults | Critical Locations | % in AES/RSA | CPU Run Time (s) |
|---|---|---|---|---|---|---|---|---|---|---|---|
| AES FSM 1 | 2.1 | 1 | Global | 1-7 | 508 | 19 | 4 | 0 | 0 | 0.00% | 1 |
| | | | Local | 1-4 | 145,824 | 7,173 | 113 | NA | 7 | 0.07% | 82 |
| AES FSM 2 | 2.1 | 1 | Global | 1-7 | 508 | 18 | 3 | 1 | 1 | 0.01% | 1 |
| | | | Local | 1-4 | 83,412 | 6,516 | 63 | NA | 7 | 0.07% | 44 |
| RSA FSM 1 | 2.2 | 1 | Global | 1-7 | 381 | 18 | 3 | 0 | 0 | 0.00% | 1 |
| | | | Local | 1-4 | 95,790 | 8,533 | 13 | NA | 8 | 0.01% | 141 |
| RSA FSM 2 | 2.2 | 1 | Global | 1-7 | 381 | 21 | 3 | 1 | 1 | 0.002% | 1 |
| | | | Local | 1-4 | 72,471 | 5,104 | 14 | NA | 7 | 0.01% | 137 |
| AES KS | 3.1 | 100 | Global | 1 | 420 | 12 | 12 | 6 | 6 | 0.06% | 432 |
| | | | Local | 1 | 6,921 | 1,783 | 1,783 | NA | 1,783 | 17.33% | 5,855 |
| AES KS | 3.2 | 100 | Global | 1 | 420 | 0 | 0 | 0 | 0 | 0.00% | 414 |
| | | | Local | 1 | 6,921 | 1 | 1 | NA | 1 | 0.01% | 4,993 |

C. Security Properties against DFA

Differential fault analysis (DFA) is one of the most well-known fault-injection attacks to compromise the secret key of cryptography devices. By injecting faults at a specific location and time during the encryption and comparing the faulty and correct ciphertext, clues of the secret key can be deduced. Hence, the key space can be significantly reduced to make brute force attack practical. Different DFA attacks may require different faults in terms of size, location, and time. If the required faults for DFA can never be satisfied, the attack would not succeed.

Here, the threat from three highly cited DFA attacks on the key schedule (KS) of AES are evaluated. The corresponding security properties are defined to protect the design against these DFA attacks.

SP3.1: At the 9th round of AES, any 1-3 bytes of the first word in the round key cannot be faulty and the faulty bytes cannot propagate to the following words in the same round.

SP3.2: At the 9th round of AES, 4 bytes of any word in the round key cannot be faulty and the faulty bytes cannot propagate to the following words in the same round.

The AES benchmark used in this experiment is the same one used in SP1. The information of the extracted key schedule module in the AES is shown in Table 11. One hundred random key input vectors are applied as stimulus in the fault simulation. Considering the AES key schedule benchmark is much larger than the AES FSM and more stimulus are applied, only one concurrent fault location is considered in the fault simulation. Hence, the number of critical faults would be equal to the number of effective faults and the number of critical locations would be equal to the number of critical faults or feasible faults, if available.

The fault simulation results are shown in Table 12. As shown, there are many more critical locations for SP3.1 than SP3.2, especially for the local faults assessment. It is because a single transient fault injected at any fan-in cell of the first word registers is very likely to result in 1-3 bytes fault in the first word of the round key, which is violating SP3.1. In addition, the total number of fan-in cells of the first word registers is ~1,830. Therefore, it is easy to understand why there are 1,783 critical locations identified in the local faults assessment for SP3.1. Compared to SP3.1, the critical locations identified for SP3.2 are much fewer: zero and one for global and local faults assessment, respectively. It is because SP3.2 requires all four bytes in a word to be faulty, which is difficult to be implemented by a fault with only one fault location. If a fault with multiple fault locations is injected, there might be more critical locations identified, however, the possibility to inject such fault at specific locations to violate SP3.2 might be much smaller than implementing a single location fault. Therefore, SP3.1 is more vulnerable to fault-injection attack, which indicates the DFA attack targeting a fewer bytes in the round key is more dangerous and requires more resources to defend. Except the local faults assessment for SP3.1, there are still less than 0.1% of the cells in AES identified as critical locations to fault-injection attacks.

The last column shows the CPU run time of different simulations. As shown, the CPU time is dependent to many factors, such as the benchmark size, the number of stimulus, the fault category, and the number of total faults. Generally, the larger benchmark, the more stimulus, and the more faults require longer run time to execute the fault simulation.

V. CONCLUSION

Embodiments of the present disclosure bridge the gap between the need for automated security assessment tools against fault-injection attacks and the capability of existing computer-aided design (CAD) tools commonly utilized by chip designers. Presented are an automated framework for fault-injection vulnerability assessment at gate-level while targeting security properties using novel models and metrics. The fault models are characterized from specific fault-injection techniques and the fault simulation is performed with security properties taken into consideration, so that the critical locations to fault-injection attacks are identified. Experimental results from AES and RSA show that for most security properties considered herein, by protecting less than 0.1% critical locations in the design, the threat from fault-injection attacks can be significantly mitigated.

Embodiments herein may be expanded to the RTL level, as well as the physical level. Embodiments herein may also be applied to larger SoC benchmarks with more security properties. In addition, local countermeasures may be developed to protect the identified critical locations more efficiently with lower overhead.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for assessing fault-injection vulnerability of an integrated circuit (IC) design, the method comprising:
   generating, based at least in part on a fault-injection technique specification, one or more fault models corresponding to one or more faults, wherein each fault model comprises a plurality of attributes of a corresponding fault, and wherein the plurality of attributes of a corresponding fault comprises a fault category, a fault-injection location, a fault-injection time, a fault type, and a fault duration;
   selecting, based at least in part on the one or more fault models and one or more executable security properties associated with a design file of an IC design, a fault list identifying one or more possible faults for the IC design;
   identifying, based at least in part on performing a fault simulation on the design file with the fault list, one or more critical locations of the IC design; and
   implementing one or more protections at the one or more critical locations of the IC design, the one or more protections configured to reduce vulnerability of the IC design to at least one possible fault of the fault list.

2. The method of claim 1, further comprising:
   determining whether any possible faults of the plurality of possible faults can be practically implemented by a fault-injection technique associated with the fault-injection technique specification.

3. The method of claim 1, wherein the fault list is configured to, for each identified fault, describe at least one of: (i) a fault time at which the fault is predicted to occur, (ii) a fault location comprising at least one gate of the IC design, (iii) a fault type, and (iv) a fault duration.

4. The method of claim 1, wherein a critical location of the IC design comprises a gate of the IC design at which injection of any fault of the plurality of possible faults results in violation of any of the one or more executable security properties.

5. The method of claim 1, further comprising determining whether a count of the one or more critical locations identified in the IC design exceeds a vulnerability threshold.

6. The method of claim 1, wherein each of the one or more critical locations of the IC design is a location common to a subset of critical faults from the fault list.

7. The method of claim 1, wherein the fault simulation is performed, for each of the one or more executable security properties, on a fan-in circuit extracted from the design file and associated with the executable security property.

8. The method of claim 1, wherein the fault simulation is performed using one or more stimulus vectors determined based at least in part on commonly used input patterns for the IC design.

9. An apparatus for assessing fault-injection vulnerability of an integrated circuit (IC) design, the apparatus comprising at least one processor and at least one memory including program code, the at least one memory and the program code configured to, with the at least one processor, cause the apparatus to at least:
generate, based at least in part on a fault-injection technique specification, one or more fault models corresponding to one or more faults, wherein each fault model comprises a plurality of attributes of a corresponding fault, and wherein the plurality of attributes of a corresponding fault comprises a fault category, a fault-injection location, a fault-injection time, a fault type, and a fault duration;
select, based at least in part on the one or more fault models and one or more executable security properties associated with a design file of an IC design, a fault list identifying one or more possible faults for the IC design;
identify, based at least in part on performing a fault simulation on the design file with the fault list, one or more critical locations of the IC design; and
implement one or more protections at the one or more critical locations of the IC design, the one or more protections configured to reduce vulnerability of the IC design to at least one possible fault of the fault list.

10. The apparatus of claim 9, wherein the at least one memory and the program code are further configured to, with the at least one processor, cause the apparatus to at least:
determine whether any possible faults of the plurality of possible faults can be practically implemented by a fault-injection technique associated with the fault-injection technique specification.

11. The apparatus of claim 9, wherein the fault list is configured to, for each identified fault, describe at least one of: (i) a fault time at which the fault is predicted to occur, (ii) a fault location comprising at least one gate of the IC design, (iii) a fault type, and (iv) a fault duration.

12. The apparatus of claim 9, wherein a critical location of the IC design comprises a gate of the IC design at which injection of any fault of the plurality of possible faults results in violation of any of the one or more executable security properties.

13. The apparatus of claim 9, wherein the at least one memory and the program code are further configured to, with the at least one processor, cause the apparatus to at least:
determine whether a count of the one or more critical locations identified in the IC design exceeds a vulnerability threshold.

14. The apparatus of claim 9, wherein each of the one or more critical locations of the IC design is a location common to a subset of critical faults from the fault list.

15. The apparatus of claim 9, wherein the fault simulation is performed, for each of the one or more executable security properties, on a fan-in circuit extracted from the design file and associated with the executable security property.

16. A non-transitory computer storage medium for assessing fault-injection vulnerability of an IC design, the non-transitory computer storage medium comprising instructions for assessing fault-injection vulnerability of an IC design, the instructions being configured to cause one or more processors to at least perform operations configured to:
generate, based at least in part on a fault-injection technique specification, one or more fault models corresponding to one or more faults, wherein each fault model comprises a plurality of attributes of a corresponding fault, and wherein the plurality of attributes of a corresponding fault comprises a fault category, a fault-injection location, a fault-injection time, a fault type, and a fault duration;
select, based at least in part on the one or more fault models and one or more executable security properties associated with a design file of an IC design, a fault list identifying one or more possible faults for the IC design;
identify, based at least in part on performing a fault simulation on the design file with the fault list, one or more critical locations of the IC design; and
implement one or more protections at the one or more critical locations of the IC design, the one or more protections configured to reduce vulnerability of the IC design to at least one possible fault of the fault list.

17. The non-transitory computer storage medium of claim 16, wherein the instructions are further configured to cause one or more processors to at least perform operations configured to:
determine whether any possible faults of the plurality of possible faults can be practically implemented by a fault-injection technique associated with the fault-injection technique specification.

18. The non-transitory computer storage medium of claim 16, wherein a critical location of the IC design comprises a gate of the IC design at which injection of any fault of the plurality of possible faults results in violation of any of the one or more executable security properties.

19. The non-transitory computer storage medium of claim 16, wherein the instructions are further configured to cause one or more processors to at least perform operations configured to:
determine whether a count of the one or more critical locations identified in the IC design exceeds a vulnerability threshold.

20. The non-transitory computer storage medium of claim 16, wherein each of the one or more critical locations of the IC design is a location common to a subset of critical faults from the fault list.

* * * * *